(12) United States Patent
Maggiore

(10) Patent No.: US 8,581,738 B2
(45) Date of Patent: Nov. 12, 2013

(54) ASSEMBLING METHOD, MONITORING METHOD, AND AUGMENTED REALITY SYSTEM USED FOR INDICATING CORRECT CONNECTION OF PARTS

(75) Inventor: Frank Maggiore, Port Jefferson Station, NY (US)

(73) Assignee: Sartorius Stedim Biotech GmbH (DE)

( * ) Notice: Subject to any disclaimer, the term of this patent is extended or adjusted under 35 U.S.C. 154(b) by 221 days.

(21) Appl. No.: 13/217,972

(22) Filed: Aug. 25, 2011

(65) Prior Publication Data
US 2013/0049976 A1 Feb. 28, 2013

(51) Int. Cl.
*G08B 21/00* (2006.01)

(52) U.S. Cl.
USPC ........................................ 340/686.1; 340/540

(58) Field of Classification Search
USPC ................ 340/686.1, 687, 540, 500, 999
See application file for complete search history.

(56) References Cited

U.S. PATENT DOCUMENTS

2012/0274474 A1* 11/2012 Zhou .............................. 340/687

* cited by examiner

*Primary Examiner* — Jeffery Hofsass
(74) *Attorney, Agent, or Firm* — Gerald E. Hespos; Michael J. Porco; Matthew T. Hespos

(57) ABSTRACT

An augmented reality system and an assembling method are provided for assembling a first set-up component to a second set-up component under the assistance of an augmented reality system. The augmented realty system may capture a first part of a marker and a second part of the marker associated with the respective component. The augmented realty system may capture a variable marker associated with one of the components. The augmented realty system may capture a first marker and a second marker associated with the respective component. The augmented reality system can recognize the location and/or status of the markers and thus decide whether the connection between the first and second set-up component is established correctly or not.

21 Claims, 14 Drawing Sheets

(C)

FIG 1
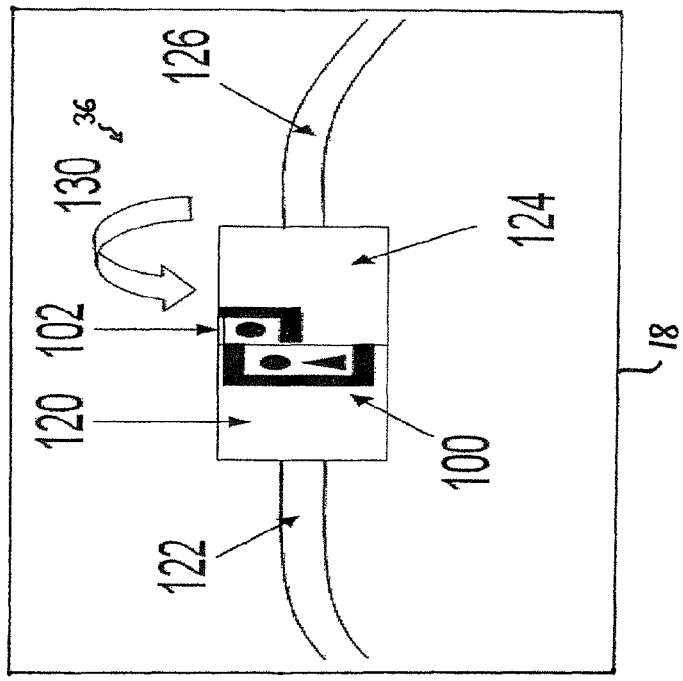
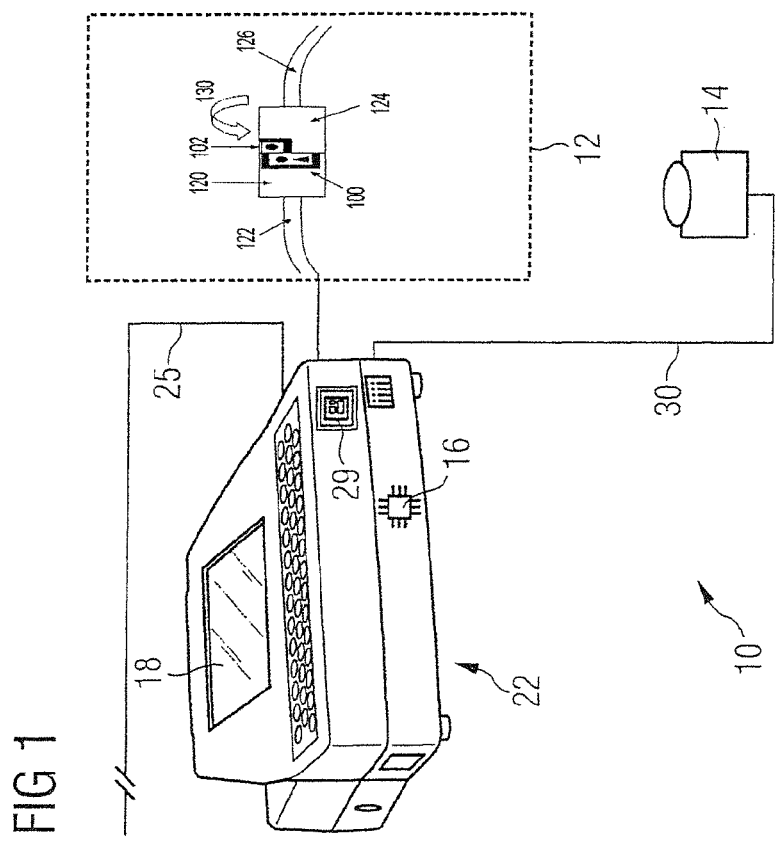

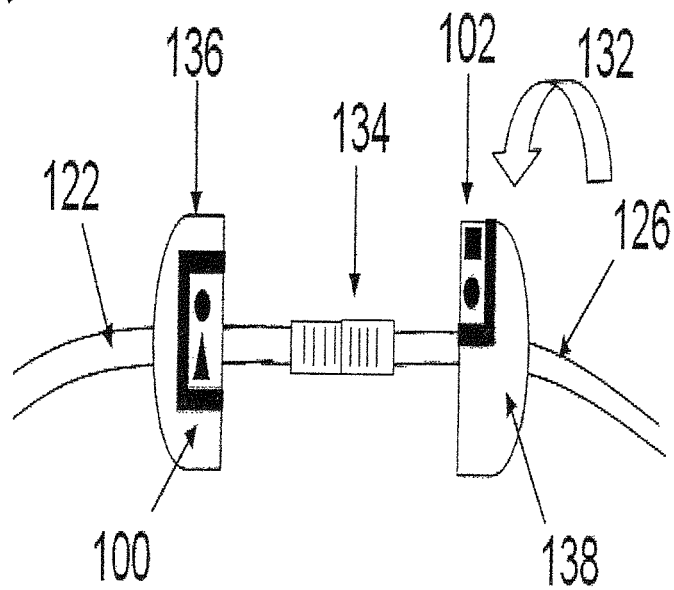
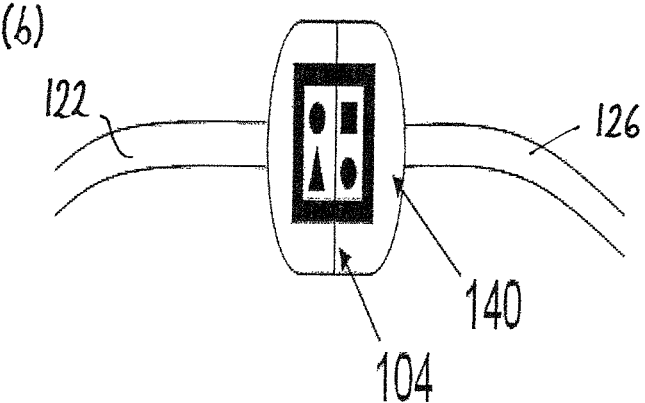
Fig. 3

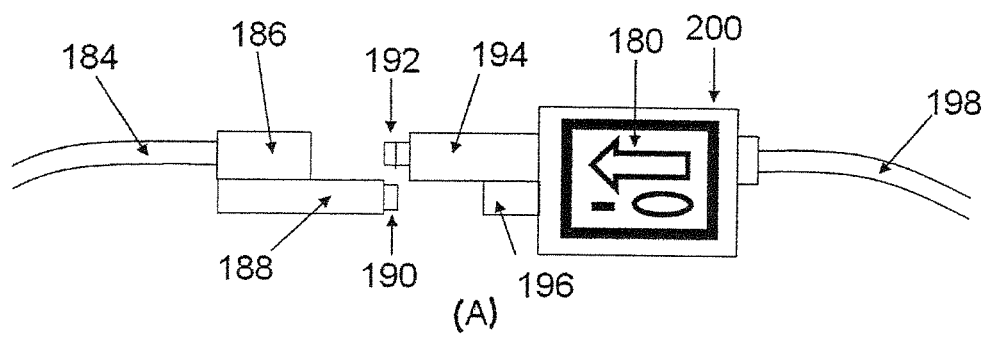
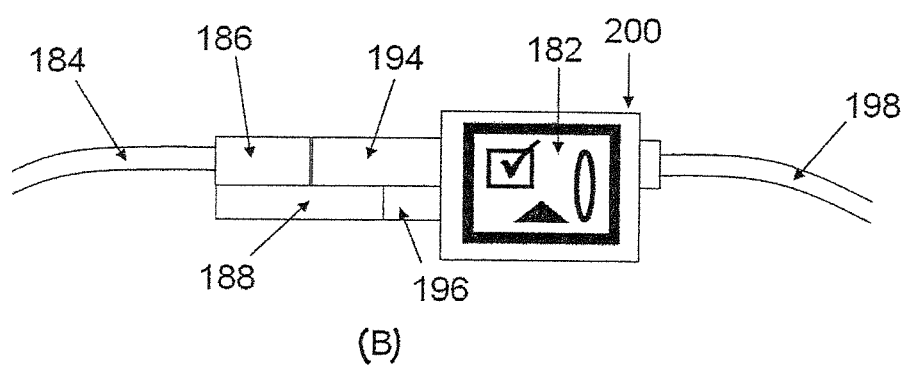
Fig. 5

ASSEMBLING METHOD, MONITORING METHOD, AND AUGMENTED REALITY SYSTEM USED FOR INDICATING CORRECT CONNECTION OF PARTS

BACKGROUND OF THE INVENTION

1. Field of the Invention

The present invention relates to improvements for the assembling and monitoring of a measurement or production set-up.

2. Description of the Related Art

It is known in the art to assemble measurement or production set-ups manually from a plurality of components. For this purpose, the assembly and correct connection of different parts to be assembled are inspected visually and/or manually. Before putting the assembly of the components into operation, an operator has to check all connections and may consult technical data sheets and select feasible components in order to assemble the set-up according to predetermined specifications.

As the complexity and configurations of measurement or production set-ups increases, operators are looking for directed instruction for how to properly setup, connect, use, troubleshoot, service, and maintain the components. This issue is particularly important within the biopharmaceutical industry where strict industry regulations, documentation requirements, the high value of product, and the customization of components and equipment, particularly in single-use disposable systems, leads to an ever increasing complexity for operators. The process components itself and associated devices should be intelligent and intuitive to use. Further, the operator should be guided through process operations without having to navigate several manuals containing sections that may not apply to the customer's individualized measurement or production set-up.

Thus, an object of the present invention is to propose a method, a computer program product and an augmented reality system that permit an efficient assembly and monitoring of a measurement or production setup.

SUMMARY OF THE INVENTION

According to the invention, this object is attained by the subject-matter of the independent claims. Preferred embodiments of the invention are set forth in the dependent claims.

One aspect of the invention is related to an assembling method for assembling a first set-up component to a second set-up component comprising the steps: capturing sensing data belonging to a working space by means of at least one sensing device of an augmented reality, wherein the captured sensing data includes at least a part of the first set-up component and at least a part of the second set-up component and a marker associated with the first set-up component and/or the second set-up component and wherein the second set-up component is arrangable to the first set-up component in a positional and/or functional relationship; identifying the marker; deciding on a status of the positional and/or functional relationship of the first set-up component and the second set-up component with respect to each other; outputting an augmented representation of at least part of the captured sensing data and the decision of the status of the relationship.

The assembling method can be computer aided. The positional and/or functional relationship can be an alignment or a connection, such as a mechanical and/or electrical connection. The step of identifying the marker may be performed by means of a processing device of the augmented reality system. The deciding step marker may also be performed by means of the processing device.

Particularly, the marker can be a variable marker having at least two states. Thereby, a first state of the marker can be a divided state, wherein the marker is divided into at least two parts. A second state can be an assembled state, wherein the at least two parts of the marker are aligned to each other in a predetermined way. The first set-up component may comprise a first part of a marker and the second set-up component may comprise a second part of the marker. Since the second set-up component is arrangable in a positional and/or functional relationship, such as connectable, to the first set-up component both parts of the marker are divided in case the first and second set-up components are not arranged according to the relationship, such as not connected, and the marker is completed in case the first and second set-up component are arranged according to the relationship, such as aligned or connected, with respect to each other. The marker is, therefore, a variable marker having a first state of non-aligned parts of the marker and a second state of aligned part of the marker. The marker may be identified by the processing device when the first part of the marker and the second part of the marker are aligned with each other, while the marker may not be identified when the parts of the marker are not assembled to each other, that is when the first and second set-up component are disconnected from each other. Based thereon, the processing device can make a decision on a status of the alignment or connection of the first set-up component and the second set-up component.

Alternatively, the marker can be associated with only the first or second set-up component. Assuming that the second set-up component comprises the marker, which is a variable marker. The term variable marker means in this context, that the variable marker is in a first marker state when the first set-up component and the second set-up component are disconnected and in a second marker state when the first set-up component and the second set-up component are connected and wherein the variable marker turns form the first marker state to the second marker state, when the first set-up component is connected to the second set-up component. By identifying the state of the marker, the status of the connection of the first and second set-up component can be determined.

Alternatively, the first set-up component may comprise a first marker and the second set-up component may comprise a second marker. Both markers can be captured by the at least one sensing device and identified by the processing device. The decision whether the first set-up component and the second set-up component are arranged in a positional and/or functional relationship, such as connected, to each other can be based on the captured position of the first marker and the second marker, that is the relative geometrical position of both markers to each other.

In other words one embodiment provides a assembling method for assembling a first set-up component to a second set-up component comprising the steps: providing an augmented reality system with a processing device, an output device and at least one sensing device, whereby the at least one sensing device is capable of capturing sensing data belonging to a working space; providing a first set-up component comprising a first part of a marker at the working space; providing a second set-up component comprising a second part of the marker at the working space, wherein the second set-up component is connectable to the first set-up component; capturing at least a part of the first set-up component and at least a part of the second set-up component by means of the at least one sensing device, wherein the marker is identified by the processing device when the first part of the marker and the second part of the marker are aligned with each other and wherein the processing device makes a decision on a status of the alignment of the first set-up component and the second set-up component; outputting an augmented representation of at least part of the captured sensing data and the decision of the status of alignment.

Set-ups for measurement or production may comprise various laboratory set-ups or industrial set-ups such as set-ups for testing the integrity and/or filter capacity and/or filterability of a filter device, set-ups for testing the leak-tightness of container and/or disposable bags, set-ups for charging, controlling and/or discharging bioreactors, and so on. Within any one of these set-ups at least one first set-up component has to be connected to a second set-up component in order to operate the set-up. The computer-aided assembling method using the augmented reality system can reduce the probability of erroneous assemblies by an operator by automatically checking the alignment and/or the compatibility of the connected components.

The processing device can comprise a microcontroller, a microprocessor, and/or an integrated circuit configured to receive data from the at least one sensing device and transmit data to the output device. The processing device can be part of a computing system such as a PC.

The output device can comprise any one of a display device such as a monitor, a visual touch screen, a projector, a mobile device screen, a notebook or a table computer screen, a heads up display, a head mounted display (e.g. glasses having an incorporated display), a wearable display, a printer, or a haptic device, or a wired or wireless audio/visual/sensory device, or a combination of such devices. The display device can be configured for displaying the augmented image to an operator as a merged or new display with the first part and/or second part of the marker and/or the respective first and/or second set-up component. The output device can comprise a haptic device for outputting the augmented image as a merged display or output for physically sensing the marker. The augmented image can be adjusted and/or displayed in accordance with the selective positioning of the parts of the marker or the marker by the user. The display of the augmenting image can be altered to show the merged display in real-time in accordance with the position and orientation of the marker.

The at least one sensing device can comprise any of the following: a camera device, a video camera, an RFID scanner device, a near field communication device (NFC), a Global Positioning System device, a bar-code scanner device, a microphone, a laser reader device, a detector of electronic signals, a medical scanner, an electronic or visual input from industrial and/or laboratory and/or pharmaceutical equipment, a motion detection system, a visual detection system, an audio detection system, a sensory detection system, or any electronic input devices, or a combination of such devices, for the real-time detection of a position of the marker. The at least one sensing device can provide information to a processor device and/or an output device through a wired or wireless communication system. Any one of the at least one sensing devices can be powered by a powercord, a powered data cable (USB), a battery, and/or wireless power sources.

Any one of the at least one sensing devices can be located in an area of industrial manufacturing and/or a laboratory in the field of processing, mining, petrochemistry, energy, automotive, aerospace, construction, water purification, water treatment, pharmaceutics and bio-pharmaceutics near or within a working space, where the testing is carried out.

The at least one sensing device can be setup as a singular, as multiple, as remote, or as networked devices. A singular sensing device can be placed in a fixed or movable position, inside or outside of the working space and can connect directly to the processor device and/or the display device through wired or wireless connections. Multiple sensing devices can be placed in fixed and/or movable positions, inside and/or outside of the working space and may connect directly to the processor device and/or to the display device or to other sensing devices through wired or wireless connections. A remote sensing device can be placed away from the working space unit but within a remote working space connected by hosing, tubing and/or piping lines. Networked sensing devices can be located in fixed and/or movable positions, inside and/or outside of the working space and may be connected to other sensing devices or through connection hubs that can encompass multiple locations and multiple systems. These networked hubs can connect to a single processing device and/or to multiple processing devices and a single display device and/or to multiple display devices through wired or wireless connections.

According to the sensing device the sensing data can comprise image data captured at the working space by a camera, data read out from barcodes and/or RFID tags and/or NFC tags, audio data, video data, etc.

The first part and/or the second part of the marker can be of a type that is embedded and/or mounted on devices, products, parts, items or consumables or combinations thereof in order to read a unique identification from the marker in case the first part and the second part are aligned in a predetermined way. Alternatively or additionally, the aligned marker can be used to localize the respective marker. The marker can also be the shape of the components itself. Any one of the first part and second part of the marker can comprise optical markers, such as bar codes, color codes, pictograph, audio markers, the shape of items, alphanumeric characters, or electromagnetic markers, such as RFID/NFC tags, metal stripes, and so on. Any one of the first part and second part of the marker can also comprise a simulated virtual marker that comprises a virtual geospatial location and shape that are displayed on the display device. These simulated virtual marker can be linked to a physical marker, object, or location and can use a physical occluder to activate the simulated marker.

The working space may be a certain area on a working floor. The working space can be further delimited by a ceiling and/or at least one vertical wall. The vertical wall, the ceiling and/or the working floor may comprise a transparent material, which is transparent to visible light, to infrared radiation and/or ultraviolet radiation. The transparent material may be a glass, an acrylic glass, a transparent polymer, lead silicate, calcite and/or gypsum. In particular the working space may be enclosed by working floor, ceiling and at least one vertical wall, whereby the working space may be separated air-tight from the outside of the working space. The working floor, the ceiling and/or the at least one vertical wall can also comprise optical intransparent material as wood, plywood, metal plate, intransparent polymer, stone, brick, etc.

Components of the set-ups may be pumps, valves, filter devices, hose connections, flasks, reactors, containers, coolers, heaters, supply terminals, control devices, sensor devices such as temperature sensors, pressure sensors, optical sensors, and so on or combinations thereof. The components are connectable to each other, which may comprise a fluid connection, an electrical connection and/or a mechanical connection.

The correct connection of two components of the set-up can be identified by means of a recognition of the marker as such, wherein the first part of the marker is associated to a first of the two components to be connected and the second part of the marker is associated to a second of the two components.

The first part of the marker and/or the second part of the marker may be captured by the at least one sensing device. The data captured by the at least one sensing device may be transmitted to the processing device, wherein the marker can be identified by the processing device when the first part of the marker and the second part of the marker are aligned with each other, thereby forming the marker as such. In case the first part and the second part of the marker are not aligned correctly, the marker is not identified by the processing device. Thus, the processing device can generate a decision on a status of the alignment of the first set-up component and the second set-up component based on the identification of the marker, since the marker is only identified in case the first and second part of the marker are aligned correctly and, consequently, the first set-up component and the second set-up component are aligned and connected correctly. The decision may be identical to the identification of the marker after the correct alignment of the first part and the second part of the marker.

The step of outputting may comprise displaying on the display device at least a part of the captured sensing data and a representation of the decision of the status of alignment. The representation of the status of alignment can comprise a text, a pictogram, a picture, or the like. The status information can be overlayed to the display of the captured sensing data or can be shown separate from it.

Another embodiment provides a assembling method for assembling a first set-up component to a second set-up component comprising the steps: providing an augmented reality system with a processing device, an output device and at least one sensing device, whereby the at least one sensing device is capable of capturing sensing data belonging to a working space; providing a first set-up component at the working space; providing a second set-up component comprising a variable marker at the working space, wherein the second set-up component is connectable to the first set-up component, wherein the variable marker is in a first marker state when the first set-up component and the second set-up component are disconnected and in a second marker state when the first set-up component and the second set-up component are connected and wherein the variable marker turns form the first marker state to the second marker state, when the first set-up component is connected to the second set-up component; capturing at least the variable marker by means of the at least one sensing device, wherein the variable marker is identified by the processing device; outputting an augmented representation of at least part of the captured sensing data and the decision whether the variable marker is in first marker state or in the second marker state.

The method is similar to the above described method for assembling a first set-up component to a second set-up component and, therefore, the above described features are generally applicable to this aspect of the invention. However, this aspect differs from the above described aspect by the variable marker of the second set-up component. The variable marker can be identified by the processing device regardless whether the second set-up component is connected to the first set-up component or not. Since the variable marker is in the first marker state when the first set-up component and the second set-up component are disconnected and in the second marker state when the first set-up component and the second set-up component are connected, the processing device can perform a step of deciding whether the first set-up component and the second set-up component are connected to each other or not based on the state of the variable marker. Therefore, the outputting can also comprise the outputting or displaying of the decision of the status of connection of the first and second set-up component.

Another embodiment provides a assembling method for assembling a first set-up component to a second set-up component comprising the steps: providing an augmented reality system with a processing device, an output device and at least one sensing device, whereby the at least one sensing device is capable of capturing sensing data belonging to a working space; providing a first set-up component comprising a first marker at the working space; providing a second set-up component comprising a second marker at the working space, wherein the second set-up component is connectable to the first set-up component; capturing at least a part of the first set-up component with the first marker and at least a part of the second set-up component with the second marker by means of the at least one sensing device, wherein the first and second markers are identified by the processing device; deciding whether the first set-up component and the second set-up component are connected to each other based on the captured position of the first marker and the second marker; outputting an augmented representation of at least part of the captured sensing data and the decision of the status of connection of the first and second set-up component.

The method is similar to the above described methods and, therefore, the above described features are generally applicable to this aspect of the invention. However, this aspect differs from the above described aspects by the provision of two markers, wherein the first marker is associated with the first set-up component and the second marker is associated with the second set-up component. Both markers can be identified by the processing device independently from each other and regardless whether the second set-up component is connected to the first set-up component or not. Since the first marker and the second marker are geometrically arranged in a predetermined way in case the first set-up component and the second set-up component are connected to each other, the processing device can perform a step of deciding whether the first set-up component and the second set-up component are connected to each other or not based on the alignment and/or the geometrical position of the captured first and second markers. Therefore, the outputting can also comprise the outputting or displaying of the decision of the status of connection of the first and second set-up component.

Further, the processing device may retrieve respective digital information assigned to the identified marker or identified variable marker from a database. Particularly, the method can comprise an assignment or association of the identified marker or variable marker to a unique component and/or item and/or to a type of identical components and/or items. The assignment between the marker or the variable marker and the component or type of component can be performed according to an assignment list, which can be stored in a database. Additional digital information can be assigned to the identified marker or variable marker within the database.

The additional digital information can include, but is not limited to, data sheets, instructions, certifications, directions for use, validation guides, replacement part lists, assembly diagrams, comparison data from previous tests, integrity test parameters or specifications; serial, model, and lot/batch numbers; reorder information, pricing information, or any other useful information to provide to the operator and/or feed the parameters into further control devices for automatically operating the set-up.

For example, data sheets and/or testing parameters can be contained in the database, which can be a local database or a remote database. The database may be divided into a plurality of local and/or remote databases each of which can contain a different type of information. Information concerning the component can also be stored in the marker itself. For example two dimensional barcodes or RFID/NFC tags comprise an amount of information storage capacity, e.g. several hundreds or thousands of bytes, in order to store specific data about the component, at which the respective marker is mounted. Most recent data sheets and updated testing parameters for recent items or products can be provided by the manufacturer or sales representative of the respective items or products via a remote database. The remote database can be made available via an internet connection, a serial connection or a telephone line.

Depending on the information retrieved from the local and/or remote database(s) the processing unit can decide upon the compatibility of the identified components. The database(s) can comprise predefined or predefinable data fields of compatible second components for the first component and vice versa. Thus, the deciding step can comprise a checking of whether the entries in each of the data fields are mutually compatible, i.e., by retrieving or calling datasets that correspond to the entries and that are stored in the database.

The step of deciding comprises a step of automatically generating a compatibility status message or error message, if the identified components are not mutually compatible. The compatibility status message and/or error message is superposed or enriched with at least part of the captured sensing data in order to obtain an augmented representation, which can be outputted to an operator. The representation regarding the compatibility status can be located near to the respective compatible or incompatible components, thus enhancing the intelligibility of the output to the operator. Incompatible components can be faster recognized and further information such as data sheets of the respective components can be outputted for further explanation of the grounds of incompatibility. Furthermore, advice can be outputted to the operator which component to replace in order to solve the compatibility problem. Additionally an encrypted code can be embedded into the marker on the setup components and read by the augmented reality system to identify the components as a manufacturer's original device. This will prevent counterfeit components from being assembled onto a system where the quality was not controlled by the manufacturer of the original device. This data can be transmitted to the augmented reality system which can prevent further setup instructions or the operation of the device until a verified component is used in place of the counterfeit component.

Furthermore, the first set-up component and/or the second set-up component can be one of an integrity testing device, a container controlling unit, an integrity testable product, a container, a disposable container, a disposable bag, a bioreactor, a disposable bioreactor, a spinner flask, a filter device, a pump, a valve, a hose, and a supply terminal.

According to a particular embodiment of the present invention the first set-up component is an integrity testing device. The second set-up component can be any one of an integrity testable product such as filter membranes and containers containing filtration substrates such as cartridges, capsules, columns, cassettes, tanks, and vessels; containers, disposable containers and/or multiple linked containers such as bottles, vials, bags, tubes, packaging, sterilization packaging, blister packaging, vessels, drums, tubing, piping, disposable bags, bioreactors, disposable bioreactors, spinner flasks, filter devices; or pumps, valves, hoses, and supply terminals or combinations thereof. Listed below are examples of integrity and filterability tests, which can be performed by the method according to the invention.

Integrity testing of filter membranes: Non-destructive integrity testing of filter membranes and containers containing filtration substrates such as cartridges, capsules, columns, cassettes, tanks, and/or vessels are used to confirm the retentive properties of a filter and determine if the filter contains any quality defects that are out of specification. Automated and/or manual integrity testing units perform a variety of integrity tests for pre-wetted filter membranes and filters including, but not limited to, Bubble Point, Diffusion, Bubble Point and Diffusion (combination test), Pressure Drop Test, Water Intrusion Test (WIT), Water Flow Test (WFT), Multipoint Diffusion Test, and Volume measurement tests.

Filterability testing of filters: An automated and/or manual integrity testing device can be used as a platform and/or pressure source for conducting filterability testing. Filterability testing comprises multiple trials to determine the optimal filter to use in the filtration of a particular solution, media, chemical and/or gas. Filterability testing is used to determine the optimal filter properties such as filtration area, pore size, filter geometry or the combinations of filters and pre-filters to use for a solution, media, chemical and/or gas as well as the optimal conditions for filtering including temperature, pH, pressure, and flow rate. Trials are usually run initially at the small scale and then scaled up to a process level either by larger scale filterability testing or through scale-up calculations.

Filterability challenge testing of filters: Filterability challenge testing is a destructive integrity test that is used to validate a filter's retentive performance using a challenge solution and/or aerosol containing a standard of organisms including but not limited to bacterial standard (*Brevundimonas diminuta* ATCC 19146 or equivalent), a mycoplasma standard (*Acholeplasma laidlawii* or equivalent), a viral standard (bacteriaphage PP7 or equivalent), and/or some other challenge organism. The destructive filterability challenge testing is used to establish parameters that can be correlated to nondestructive physical integrity testing results using an automated and/or manual integrity testing unit.

Integrity testing of containers: Integrity testing of containers comprises non-destructive and destructive testing to determine if there are any quality defects, gaps, holes, tears, or permeation through the container material that is outside of the specifications of the container parameters. Common containers that are integrity tested include bottles, vials, bags, tubes, packaging, sterilization packaging, blister packaging, vessels, drums, tubing, piping, and other containers that are enclosed structures or combinations thereof. Integrity testing of containers utilizes pressure hold tests, vacuum hold tests, the bubble test method, other positive or negative pressure tests, dynamic flow tests, liquid immersion tests, dye indicator tests, thermal conductivity tests, acoustic tests, or trace material detection tests (including helium leak detection, helium tracer mass spectrometry, hand probe mass spectrometry, carbon dioxide leak detection, and argon trace gas electron capture). All of these tests are used to determine if the container is properly sealed, can maintain its barrier at a specified pressure, and is able to pass the integrity testing within specifications.

Integrity testing of bags: Integrity testing of bags and bag systems (which include 2 dimensional and 3 dimensional bags) are used to determine if there are any quality defects, gaps, holes, tears, or permeation through the bag material that is outside of the specifications of the container. Integrity testing of bags and bag systems utilizes pressure hold tests, inflation testing, vacuum hold tests, positive or negative pressure tests, liquid immersion tests, dye indicator tests, or trace material detection tests. All of these tests are used to determine if the bags or bag systems are properly sealed with particular attention that the bags are able to maintain its barrier at a specified pressure without deformity; that the bag welds, seams, and seals are intact; that bag ports, valves, and integrated equipment such as mixers, probes, and filters are properly sealed; that the permeability of the bag material does not exceed specification; and that the bags are able to pass the integrity testing within specified parameters. Bag and bag systems can be used as primary or secondary packaging of materials and can be used as a barrier before and after sterilization.

Integrity testing of closed systems: Integrity testing of a closed system includes performing testing on multiple linked containers simultaneously. Integrity testing of these closed systems comprises nondestructive and destructive testing to determine if there are any quality defects, gaps, holes, tears, cracks, misaligned connections, or permeation throughout the closed system that is outside of the specifications of the system parameters. Closed systems include any linked system of integrity testable products including but are not limited to isolators, barrier systems, rooms, aseptic facilities, aseptic connections, sterilization systems (clean-in-place, steam-in-place, autoclaves, gamma irradiation, ethylene oxide sterilization, vaporized hydrogen peroxide, or clean steam systems), commercial manufacturing and packaging lines, as well as any combination of linked tanks, vessels, containers, filters, bottles, tubing, piping, and bag systems. Integrity testing of closed systems utilizes pressure hold tests, vacuum hold tests, other positive or negative pressure tests, liquid immersion tests, dye indicator tests, or trace material detection tests. All of these tests are used to determine if the closed system is properly sealed, can maintain its barrier at a specified pressure, and is able to pass the integrity testing within specifications.

Integrity testing of seals: Integrity testing of seals comprises non-destructive and destructive testing to determine if there are any quality defects, gaps, holes, tears, or permeation through the seal that is outside of the specifications of the seal parameters. Seals that are commonly integrity tested include caps, stoppers, plugs, syringes, safety packaging, connections, gaskets, O-rings, ports, bonding, sealants, or adhesives that seal an integrity testable product. Integrity testing of seals utilizes visual inspection, internal pressure testing, pressure hold tests, vacuum hold tests, the bubble test method, other positive or negative pressure tests, dynamic flow tests, liquid immersion tests, dye indicator tests, thermal conductivity tests, corona beam tests, acoustic tests, or trace material detection tests (including helium leak detection, helium tracer mass spectrometry, hand probe mass spectrometry, carbon dioxide leak detection, and argon trace gas electron capture). All of these tests are used to determine if the seal is properly seated, can maintain its barrier at a specified pressure, and is able to pass the integrity testing within specifications.

Further, the assembling method may comprising the step: generating an enabling instruction in case the first set-up component is compatible to the second set-up component.

The enabling instruction may be used to prevent the set-up to be used when the first set-up component is not properly connected to the second set-up component. For example, the set-up may be controlled by the augmented reality system, which does not proceed with further steps of an experiment in case the enabling instruction was not generated. As a further example the set-up may be controlled by the integrity testing device, which will further proceed with an integrity test on an integrity testable product or with a filterability testing of a filter when the integrity testing device has received the enabling instruction from the augmented reality system.

Further, the assembling method may comprise the steps: determining the spatial distance between the first marker and the second marker based on the sensing data captured by the at least on sensing device, wherein the processing device makes a decision on a correct connection of the first set-up component with the second set-up component based on the determined spatial distance; output an augmented representation comprising a representation of the decision on the correct connection.

Furthermore, the marker and/or variable marker can be any one of a visual marker, an electromagnetic marker, a geospatial location marker, and an audio marker.

In one of the above assembling methods the alignment and/or the connection of the first set-up component and the second set-up component may include any one of connecting a hose, closing a clamp, connecting a wire, assembly of an item, inserting a bag into a container, and running a fluid through a pump, hose, or filter. Further, the completion of said process event can be manually registered by an operator. The operator may manually note the completion of a process event by a plurality of actions including but not limited to pushing a button, turning a knob, moving a lever, typing a command, or giving an audio cue.

Another aspect of the invention provides a monitoring method for monitoring a physical property comprising the steps: providing an augmented reality system with a processing device, an output device and at least one sensing device, whereby the at least one sensing device is capable of capturing sensing data belonging to a working space; providing a set-up component comprising a variable marker at the working space, wherein the variable marker is in a first marker state when the physical property of the set-up component is in a first property state and wherein the variable marker is in a second marker state when the physical property is in a second property state and wherein the variable marker turns form the first marker state to the second marker state, when the physical property changes from the first property state to the second property state; capturing at least the variable marker with the sensing device, wherein the variable marker is identified by the processing device; outputting an augmented representation of at least part of the captured sensing data and the decision whether the variable marker is in first marker state or in the second marker state.

The variable marker may have exact two property states defining a threshold value, wherein it can be determined from the variable marker by means of the augmented reality system whether the physical property is below or above the threshold value. The variable marker may also have a plurality of property states defining a plurality of threshold values so that the physical property can quantified depended on the number and the distance of the threshold values or marker states. The number of marker states can be 2 power N, wherein N may be a number of 1, 2, 3, 4, 5, 6, 7, 8, 9, 10, 11, 12, 13, 14, 15, 16, 17, 18, 19, 20 and so on.

The monitoring of the physical property can be performed automatically. For example the augmented reality system can be automatically or semi-automatically controlled by a computer or by the processing device, which allows a periodically capturing of the variable marker and, thus, a periodically capturing of a measurement value related to the physical property. The period of capturing, i.e. the inverse frequency of measuring the physically property, can be within periods of one millisecond to one day. Therefore, time series of the physical parameter can be recorded by the augmented reality system and may be stored in a database. The augmented reality system may also be capable to capture more than one variable marker in the working space, wherein each of the variable markers represent at least one physical parameter. Thus, a plurality of physical parameters may be monitored and a plurality of time series of physical parameters may be stored in the database.

Physical parameters may comprise but are not limited to a temperature, a pressure, an electrical conductivity, a color, an oxygen content of a fluid contained in a set-up component such as a hose, a pump, a valve, a tank, a piping, an integrity testable product, a container, and an incubated container, such as a bioreactor, a disposable bioreactor, a fermentation tank, a fermentation equipment, an incubator, a medical incubator, an animal/livestock incubator, an incubated shaker, a cell/virus culture vessel, a tissue culture vessel, a disposable incubated vessel, or a disposable bag. The physical parameter may also be related to the temperature and/or the status of the set-up component itself.

The variable marker may be part of an augmented reality assembly, which may also comprise an associated sensor such as a temperature sensor, a weight sensor, a pressure sensor, a pH value sensor, a dissolved oxygen sensor, etc., which can capture the respective physical properties of a set-up component or a fluid or any other matter contained in the set-up component.

The monitoring method can comprise the additional steps: identifying the variable marker, whereby the processing device retrieves digital information assigned to the identified variable marker from a database; and outputting an augmented representation comprising at least part of the retrieved digital information.

The retrieved digital information assigned to the identified variable marker may contain information regarding the limits of the physical property which is acceptable for running an experiment using the experimental set-up in the working space captured by the augmented reality system. The information regarding the variable marker can be hardwired in the processing device or may be provided by a manual input of an operator or by a storage medium. In case of an physical property being out of the limits for safe handling of the set-up and for successful running the experiment, an instruction to halt the operation or not to start the operation as well as an instruction to the operator to perform an appropriate action can be generated by the augmented reality system, for example by the processing device.

One aspect of the invention provides an augmented reality system for monitoring or operating a measurement or production set-up, the augmented reality system comprising: at least one sensing device capable of capturing sensing data belonging to a working space; a processing device, which is in communicatively connected to the at least one sensing device, and which is capable of capturing sensing data belonging to a working space by means of at least one sensing device of an augmented reality system further comprising a processing device and an output device, wherein the captured sensing data includes at least a part of the first set-up component and at least a part of the second set-up component and a marker associated with the first set-up component and/or the second set-up component and wherein the second set-up component is connectable to the first set-up component; identifying the marker by means of the processing device; deciding on a status of the alignment or connection of the first set-up component and the second set-up component; an output device configured for outputting an augmented representation of at least part of the captured sensing data as well as the decision on the status of alignment or connection.

The invention may be more particularly embodied as an augmented reality system for operating a measurement or production set-up, the augmented reality system comprising: at least one sensing device capable of capturing sensing data belonging to a working space; a processing device, which is in communicatively connected to the at least one sensing device, and which is capable of capturing at least a part of the first set-up component and at least a part of the second set-up component, wherein the marker is identified by the processing device when the first part of the marker and the second part of the marker are aligned with each other and wherein the processing device makes a decision on a status of the alignment of the first set-up component and the second set-up component; making a decision on the alignment of the first set-up component with the second set-up component based on the captured information; an output device for outputting an augmented representation of at least part of the captured sensing data as well as the decision on the alignment of the first and second set-up component.

An embodiment may comprise an augmented reality system for operating a measurement or production set-up, the augmented reality system comprising: at least one sensing device capable of capturing sensing data belonging to a working space; a processing device, which is in communicatively connected to the at least one sensing device, and which is capable of capturing at least one variable marker; making a decision whether the variable marker is in a first marker state or in a second marker state based on the captured information; an output device for outputting an augmented representation of at least part of the captured sensing data as well as the decision on the marker state.

Another embodiment may comprise an augmented reality system for operating a measurement or production set-up, the augmented reality system comprising: at least one sensing device capable of capturing sensing data belonging to a working space; a processing device, which is in communicatively connected to the at least one sensing device, and which is capable of capturing at least a part of the first set-up component with the first marker and at least a part of the second set-up component with the second marker, wherein the first and second markers are identified by the processing device; deciding whether the first set-up component and the second set-up component are connected to each other based on the captured position of the first marker and the second marker; an output device for outputting an augmented representation of at least part of the captured sensing data as well as the decision on the connection of the first and second set-up component.

The augmented reality system can be configured to automatically control or operate the measurement or production set-up, for example the set-up can be controlled by a computer or by the processing device. The respective control parameters for operating can be provided by means of a database, for example a remote database. Thus, the input of the parameters to the system, i.e. to the database, can be located apart from the location the set-up. The additional information regarding the compatibility of the first set-up component can be stored in a remote database, for example a database hosted by the manufacturer of the first set-up component. Thus, the compatibility information can be updated frequently.

The at least one sensing device can be any one of a camera, a still camera, a video camera, an RFID reader, a Global Positioning System device, a bar-code scanner, a microphone, a laser reader, a detector of electronic signals, a medical scanner, an electronic or visual input from industrial/laboratory/pharmaceutical equipment, a visual detection system, an audio detection system, a sensory detection system, inductive or capacitive sensor, a magnetic field sensor or any electronic input devices, or a combination of such devices.

The output device can be any one of a monitor, a touch screen, a mobile device screen, a notebook or tablet computer screen, a projector, a heads up display, a head mounted display, a wearable display, a haptic device, a braille reader, a loudspeaker, a wired or wireless audio/visual/sensory device, or a combination of such devices.

The at least one sensing device can be a camera, for example a digital video camera capable for continuously tracking the spatial position of a marker within its field of view. The camera can be a mobile camera, which can be wired or wireless connected to the processing device. With a mobile camera the operator is able to bring the camera into arbitrary positions in order to be able to bring components or marker into the field of view of the mobile camera, which may be occluded otherwise. For example a plurality of components may be arranged close together, so that a fixed camera is not able to capture the respective markers of the components. By using the mobile camera, these markers can be captured and recognized.

The output device can be a projector projecting the augmented representation onto the working space or onto a set-up component, whereby the augmented representation is adjusted and displayed in accordance with the spatial distribution of the component. The spatial distribution of the component as well as the spatial distribution of the floor, ceiling or a wall of the working space can be determined by a recognition of markers attached to or near to the desired projection surface. This surface can be inclined with respect to a projection beam of the projector or the surface can be irregularly shaped. The augmented representation can be adjusted respectively, for examples by a keystone correction, by the output device or by the processing device.

One aspect of the invention provides a computer program product, such as a computer-readable storage medium, for a computer-aided assembly of a measurement or production set-up and/or for automatically operating a measurement or production set-up, wherein the computer program product comprises coding segments that when loaded and executed on a suitable system can execute an assembly and/or monitoring method according to the invention. The storage medium according to the invention can be a volatile or permanent storage medium, such as a DVD, a CD, a floppy disk, an EEPROM, a memory card, a data stream and so on. The suitable system may comprise a general purpose computer like a PC, a workstation, a microcontroller, an embedded PC, a smartphone and the like.

One aspect of the invention is to provide a monitoring method for monitoring at least one set-up component of a measurement or production set-up comprising the steps: providing a secondary augmented reality system with a secondary processing device, a secondary output device and at least one secondary sensing device, whereby the at least one secondary sensing device is capable of capturing sensing data belonging to a working space; providing a primary augmented reality system with a primary processing device, a primary output device and at least one primary sensing device, whereby the at least one primary sensing device is capable of capturing sensing data belonging to the secondary output device; providing at least one set-up component at the working space; capturing the at least one set-up component or a marker associated to the at least one set-up component by means of the secondary sensing device; processing sensing data captured by the secondary sensing device by means of the secondary processing device; displaying a variable marker at the secondary display working space depending on the sensing data processed by the secondary processing device; capturing the variable marker by means of the primary sensing device, wherein the variable marker is identified by the primary processing device; outputting an augmented representation of at least part of the captured variable marker.

Large set-ups for measurement or production may comprise various laboratory set-ups or industrial set-ups as discussed above, which may be arranged in a way that the set-up in a working space cannot be captured by the sensing devices of a (primary) augmented reality system in total. Using a secondary augmented reality system capturing one or more set-up component(s) and/or (variable) markers associated with these set-up components the monitoring and controlling of such a set-up may be simplified. The secondary augmented reality system can act as a relay for capturing sensing data in a part of working space that cannot be captured by the sensing device of the primary augmented reality system. For example, the working space may comprise an external space which is spaced apart from the remaining working space.

Accordingly, one aspect of the invention is to provide an augmented reality system for monitoring a measurement or production set-up, the augmented reality system comprising: a secondary augmented reality system with a secondary processing device, a secondary output device and at least one secondary sensing device, whereby the at least one secondary sensing device is capable of capturing sensing data belonging to a working space; a primary augmented reality system with a primary processing device, a primary output device and at least one primary sensing device, whereby the at least one primary sensing device is capable of capturing sensing data belonging to the secondary output device, wherein the at least one the secondary sensing device is capable to capture a set-up component or a marker associated to the at least one set-up component located in the working space; wherein the secondary processing device is capable of processing sensing data captured by the secondary sensing device and configured to generate a marker or variable marker based on the processing; wherein the secondary output device is configured to display the generated marker or variable marker and wherein the primary output device is configured to display an augmented representation of at least part of the captured marker or variable marker.

Further, the primary augmented reality system can be a mobile device, so that the secondary display can be used to transmit information regarding the actual state of the set-up in the working space captured by the secondary augmented reality system to the mobile primary augmented reality system to inform a user holding or wearing the mobile device. The mobile device may be a handheld computer, a smartphone, a laptop or the like.

The secondary processing unit can also perform a recognition of the captured marker or variable marker of the set-up component captured by the at least one secondary sensing device. As discussed above the markers or variable marker may indicate the connection or alignment status of two set-up components or may indicate the quantity of a physical property associated in one of the set-up components. The secondary processing device may process the captured marker or variable markers and may decide on the connection or alignment status and/or the quantity of the physical property. Optionally, the secondary processing device may retrieve additional data related to the recognized (variable) markers from a local or remote database. Furthermore, the secondary processing device may carry out further data processing or computing of further parameters based on the captured data in order to display the result via the secondary display device, for example by generating a marker or variable marker and display this marker on the secondary display. Optionally, the secondary display may also display parts of the captured data, that is the data sensed by the at least one secondary sensing device. The marker or variable marker may be overlayed in part or totally to the displayed captured data.

In other words, the invention is directed to an augmented reality system and an assembling method for assembling a first set-up component to a second set-up component under the assistance of an augmented reality system. The augmented realty system may capture a first part of a marker and a second part of the marker associated with the respective component. The augmented realty system may capture a variable marker associated with one of the components. The augmented realty system may capture a first marker and a second marker associated with the respective component. The augmented reality system can recognize the location and/or status of the markers and thus decide whether the connection between the first and second set-up component is established correctly or not. It has to be understood, that the above described invention is also capable of monitoring and/or deciding whether a connection of a first and second component is disrupted, for example by cutting a component into two pieces forming the first and second component. Further details of the structure and functions of an augmented reality system can be found in U.S. provisional application 61/353,377, which disclosure is incorporated herewith in its entirety.

Additional objects, advantages and features of the present invention will now be described in greater detail, by way of example, with reference to preferred embodiments depicted in the drawing.

BRIEF DESCRIPTION OF THE DRAWINGS

FIG. 1 illustrates a preferred embodiment of an augmented reality system.
FIG. 3 shows two hoses in a disconnected and a connected state;
FIG. 5 shows an embodiment of a variable marker associated with a first connector.

DETAILED DESCRIPTION OF THE PREFERRED EMBODIMENTS

Figure 2:
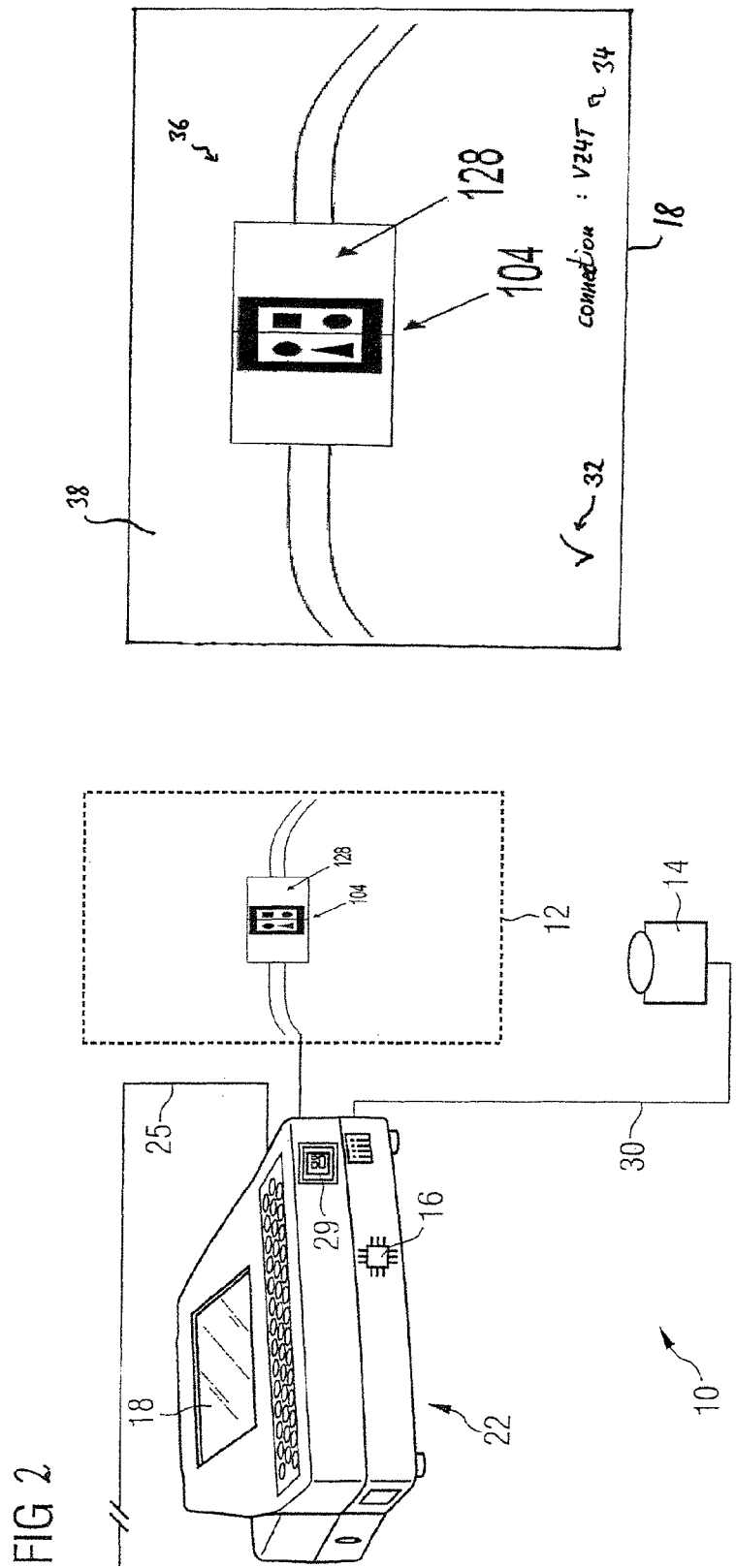
FIG. 2 shows the system of FIG. 1 at a later stage.

FIGS. 1 and 2 show an augmented reality system 10, which can be used for monitoring the connection of a hose comprising a left hose part 122 and a right hose part 126 located in a working space 12. The augmented reality system comprises at least one sensing device 14, a processing device 16, an augmented reality software, and at least one display system 18. One or more of the comprises at least one sensing device 14, the processing device 16, and at least one display system 18 can be part of a testing device 22.

The working space 12 may be delimited by a working floor, a ceiling and/or at least one vertical wall. The vertical wall, the ceiling and/or the working floor may comprise a transparent material, which is transparent to visible light, to infrared radiation and/or ultraviolet radiation. The transparent material may be a glass, an acrylic glass, a transparent polymer, lead silicate, calcite and/or gypsum. In particular the working space may be enclosed by working floor, ceiling and at least one vertical wall, whereby the working space may be separated air-tight from the outside of the working space 12.

The at least one sensing device 14 is configured to detect at least one type of marker that is embedded and/or mounted on devices, products, parts, items or consumables in order to read a unique identification from the marker and/or localize the marker. As shown in FIGS. 1 and 2 the at least one sensing device 14 may comprise a camera device 14, which is adapted to capture images of a predetermined working space 12 and to provide the captured image data to the processing device 16. As shown in FIGS. 1 and 2, a testing setup including the hose 122, 126 can be located within the working space 12 and the assembling procedure may include fluidly connecting the left hose part 122 with the right hose part 126, for example by turning the right hose part 126 relative to the left hose part 122, as this is required e.g. for screw connectors.

The testing device 22 comprising the processing device can be located at least partly within the working space 12 or outside the working space 12. A fluid connection can be established between the testing device 22 and another set-up component by the hose 122, 126. The testing device 22 can be configured to provide a fluid, i.e. a gas or a liquid, in order to provide the fluid via the hose 122, 126 to one or more further set-up components.

The camera device 14 is configured to capture optical markers, e.g. bar codes, color codes, pictograph, the shape of items, alphanumeric characters etc., which may be located on the items located in the working space. As an example a first part of a connector marker 100 in form of a pictograph is attached to the left connector 120 attached to the left hose part 122 and a second part of a connector marker 102 connection hose marker is attached to the right connector 124 attached to the right hose part 126. In order to fluidly connect both connectors 120, 124 correctly, the right connector 124 may be twisted counter clockwise along the turning direction 130.

With reference to FIG. 1, the second part of the connector marker 102 is incomplete and, therefore, the connector marker is not recognized by the processing device 16 of the augmented reality system. A representation of the image data 36 of the working space 12 captured by the camera 14 can be presented to an operator on the display device 18. The display device 18 can comprise a monitor, e.g. a liquid crystal display (LCD), a cathode ray tube (CRT), a touch screen monitor and/or a projector (beamer). The display device 18 can be fixedly located, e.g. at the working space, at the processing device 16, at the testing device 22 or at a distant location like a control center. Further, the display device 18 can a mobile display device, e.g. the display of a notebook computer, a tablet computer, a cell phone, a wearable display or a head mounted or heads up display.

With reference to FIG. 2 the hose connectors 120, 124 can be connected and/or locked into place by a twisting action 130, which also properly aligns the first part of the connector marker 100 and the second part of the connector marker 102. As a result the pictograph of connector marker 104 is completed and can be identified by the processing device 16.

In order to support the operator in setting up the component in the working space 12, the processing device 16 can analyze the image data obtained from the camera device 14, identify any marker contained in the image data. Since the completed connector marker 104 can be identified by the processing device a status information 32 can be displayed on the display device 18. Furthermore, based on the identified connector marker 104 additional information can be retrieved from a database correlated to identified markers and superimpose the representation of the additional information 34 with a part of the image data 36 in order to generate an augmented display image 38. The image data 36 and the representation of the additional information 34 can be displayed in real-time, whereby the identified marker 104 can be used for positioning the representation of the additional information 34 within the augmented display image 38. The representation of the additional information 34 can comprise texts and/or graphical elements, whereby the representation of the additional information 34 and the image of the correlated item, e.g. the connector 128 comprising the connector marker 104, can be positioned closely together within the displayed augmented image 38. Sometimes it may even be preferred that the additional information at least partly covers the correlated item shown in the augmented image 38.

The at least one camera device 14 can be positioned in the interior and/or exterior of the working space 12. In case one of the at least one camera device 14 is positioned inside the working space 12, the respective camera device 14 may be encapsulated fluid proof by a camera casing in order to avoid a contamination of the camera device 14 with chemicals and/or microorganisms from within the working space 12. In case one of the at least one camera device 14 is positioned outside the working space 12, the respective camera device 14 may be capturing the images of the working space 12 through a transparent vertical wall, ceiling or working floor. In order to enable a determination of positions of various items relative to predetermined locations of the working space 12 the working floor, the ceiling and/or the at least one vertical wall may be provided with at least one fixed marker.

The camera device 14 may be a video camera or a still camera, whereby the camera device 14 may be positioned at a fixed position relative to the working space 12 or may be movable with respect to the working space 12, thus capturing images of the working space 12 from different angles of view. In case of a mobile camera device 14, the processing device 16 may control a camera positioning device, which is configured to transfer the camera device 14 from one angle of view to another angle of view.

The camera device 14 may be sensitive to visible light, infrared radiation and/or ultraviolet radiation of at least one wavelength. The camera device 14 may repeatedly capture images of the working space, whereby the image capturing frequency may be variable or constant, e.g. larger than approximately 1 Hz, preferably approximately 25 Hz. The image data captured by the camera device 14 may be transmitted to the processing device 16 via a cable connection 30 or via electromagnetic waves. The processing device 16 is configured to process the image data captured from the at least one camera device 14 in order to extract the image of any marker, e.g. the connector marker 104, contained in the captured image data. The extracted marker image(s) may be matched with a dataset from a local or remote database in order to identify the marker and retrieve additional information belonging to the identified marker from the database or from other data sources, which location is stored in the database. Based on the retrieved additional information and the captured image data the processing device 16 can compute status information of the testing setup.

The augmented reality system 10 shown in FIGS. 1 and 2 can be utilized in multiple ways to assist the operator in obtaining information and/or for performing tasks related to the testing device 22. The displaying of additional information about equipment, parts, consumables and/or items, e.g. the connector 128, located in the working space 12 and/or attached to the testing device 22 can be achieved by capturing the respective marker attached to or embedded in the physical item by the at least one sensing device 14, whereby a unique identification of the marker is matched with the database by the processing device 16. As an example, the connector marker 104 attached to the connector 128 is captured by the camera device 14, identified by the processing device 16 and additional information related to the connector 128, which may be contained in an internal database of the processing device 16, is retrieved and a representation of the additional information 34 is displayed on the display device 18. The additional information linked to the marker can be accessed by changing the orientation or angle of the physical item, e.g. the connector 128, or by changing the angle of view of the at least one camera device 14.

As an example, displaying additional information about an item located in the working space 12 or initiating a predetermined action of the system 10 or the testing device 22 can be triggered by a physical movement of the item that may change the properties of the marker or by occluding the marker of the item.

Since the augmented reality system shown in FIGS. 1 and 2 can capture and detect multiple markers by means of the camera device 14 the processing unit 16 can compare the distances, the orientation, and the relationship between the detected markers based on the captured images of the working space 12. The processing unit 16 may compare the determined distances with an local or remote database to confirm with the operator if a particular unit and/or setup is properly assembled and if corrections in the setup need to be made prior to use. This will allow the operator to have the setup of equipment located in the working space 12 checked by the augmented reality system 10. In case the setup is not assembled correctly, the processing unit may issue instructions to the display device 18 to show how to reach the correct setup prior to the use of the setup.

In case the assembly of the connector 104 and/or further components of the testing set-up is/are correct, information concerning the further proceedings may be displayed within the augmented display image 38. For example data sheets and testing parameters can be displayed on the display device 18. According to the data sheets and testing parameters the operator can perform the testing. The data sheets and/or testing parameters can be retrieved from a local database or from a remote database. Most recent data sheets and testing parameters for recent items or products can be provided by the manufacturer or sales representative of the respective items or products via a remote database.

With regard to the FIGS. 1 and 2, the status information and/or the retrieved additional information like the testing parameters can be used to control the testing device 22. Thus, the processing device 16 can be connected via a cable or a wireless connection to the testing device 22 for data exchange. Further, the processing device 16 and the testing device 22 may be arranged in one housing. The housing may further comprise a housing marker 29 in order to detect the presence and/or position of the testing device 22 in the working space 12. The testing device 22 may further comprise a fluid source 25, which may provide the hose 122, 126 with a fluid. The augmented display image 38 displayed to the operator by means of the display device 18 may comprise control elements for controlling the test procedure and/or for selecting predefined actions, such as retrieving information, start the testing and so on.

In case the setup is not assembled correctly, the processing unit 16 may block an activation of the integrity testing device 22 until a correct assembly is established or the operator overrides the blocking by entering an override instruction. The blocking of the activation may comprise that the testing device interrupts a fluid connection between the fluid source 25 and the hose 122, 126.

FIG. 3 shows in view (a) a front view of two hoses, namely a left hose 122 and a right hose 126, that are connected together with connectors 134. A left external collar 136 with a left half of a connector marker 100 is incomplete and is not recognized by the augmented reality system. A right external collar 138 with a right half of the connector marker 102 is partially obscured from view, is also incomplete, and is therefore not recognized by the augmented reality system. The external collars 136, 138 can be locked into place by a twisting action 132 which properly aligns the halves of the connector markers 100, 102. View (b) of FIG. 3 is a front view of the two external collars 136, 138 that are connected together. The connected external collars 140 have a properly aligned connector marker 104 that is recognized by the augmented reality system and registers with the system as a completed work event and the successful assembly of the two hoses 122, 126.

Figure 4:
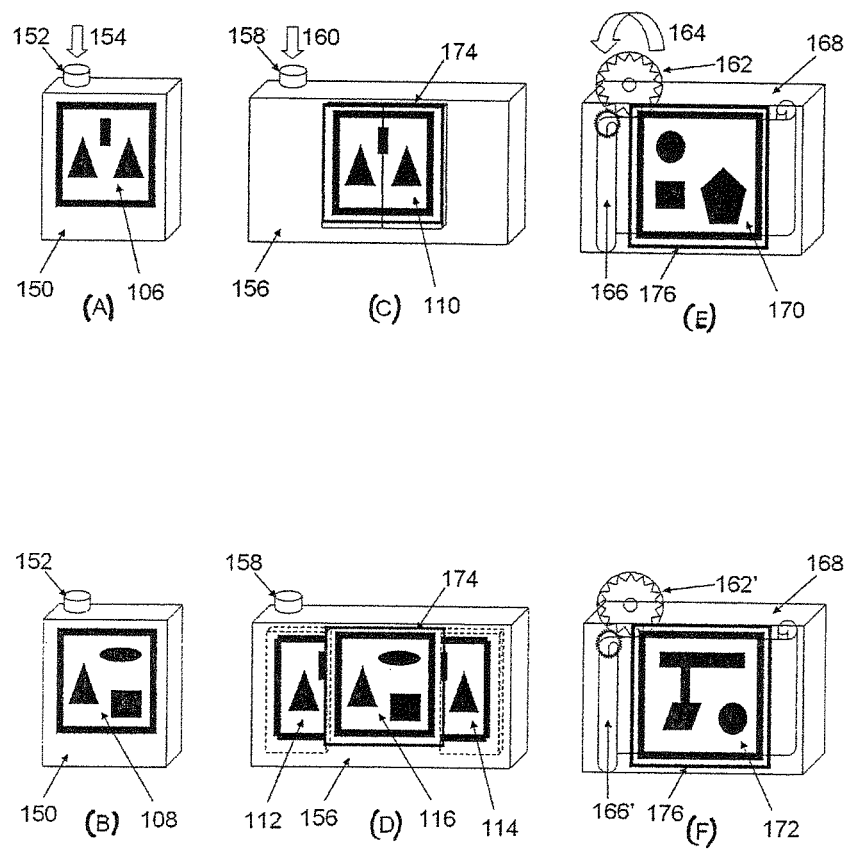
FIG. 4 shows embodiments of a variable marker that is manually changeable by an operator.

FIG. 4 shows embodiments of a variable marker that is manually changeable by an operator. View (A) of FIG. 4 is a front view of visual display 150, in particular an electronic visual display, that is displaying a visual variable marker 106. The operator may push a visual display button 152 with a pushing action 154 in order to denote that a work task has been completed. Accordingly, view (B) of FIG. 4 shows the visual display 150 after the visual display button 152 has been pushed by the operator and a new visual marker 108 is presented to the augmented reality system.

View (C) of FIG. 4 shows a front view of a visual display 156, in particular a mechanical or manual display, that is displaying a visual variable marker 110 through a window 174. The operator may push a manual display button 158, wherein the pushing action 160 denotes that a work task has been completed. Because of the pushing action 160 the variable marker 110 changes to a state as shown in view (D) of FIG. 4. As shown, an internal lever (not shown) that separates the variable marker 110 into a left half 112 and a right half 114, when the visual display button 158 is pushed by the operator. The left half 112 and the right half 114 slide to each side and another marker 116 is revealed underneath that is visible through the window 174 and is presented to the augmented reality system.

View (E) of FIG. 4 shows is a front view of a scrolling banner visual display 168, particularly a manual scrolling banner visual display, that has a visual variable marker 170 displayed through a window 176. The operator may wind the scroll wheel 162 with a winding action 164 in order to moves the visual display on the internal scroll 166 so that a new marker becomes visible through the window 176, as shown in view (F) of FIG. 4. After the operator has turned the scroll wheel to a secondary position 162' and the internal scroll banner has moved to a new position 166', the new visual variable marker 172 is presented through the window 176 to the augmented reality system.

FIG. 5 shows an embodiment of a variable marker 180,182 associated with a first connector 194. View (A) of FIG. 4 shows a front view of a first tubing 184 which uses a first connector 186 to connect to a hose 198 through a second connector 194, which is complementary to the first connector 186. For example the first connector 194 can be a female connector 194 and the second connector 194 can be a male connector 194, which may comprise a male quick connector 192. An first adjacent connector 188 attached to the main first (female) connector 186 contains a male shaft 190 that connects with an second adjacent (female) connector 196 of the second connector 194. A visual variable display assembly 200 presents a first state of a variable marker 180 prior to the connection of the hose 198. View (B) shows a front view of the connected hose assembly where the first and second connectors 186, 194 are properly connected and the first and second adjacent associated connectors 188, 196 are properly connected. When the adjacent associated connectors 188, 196 are connected the male shaft 190 may push an internal mechanism on the second adjacent connector 196, causing a mechanical and/or electronic contact or button to transfer a mechanical and/or electronic signal to the variable display assembly 200 where it results in a change of the variable display to present a second state of the variable marker 182 which is presented to the augmented reality system.

Figure 6:
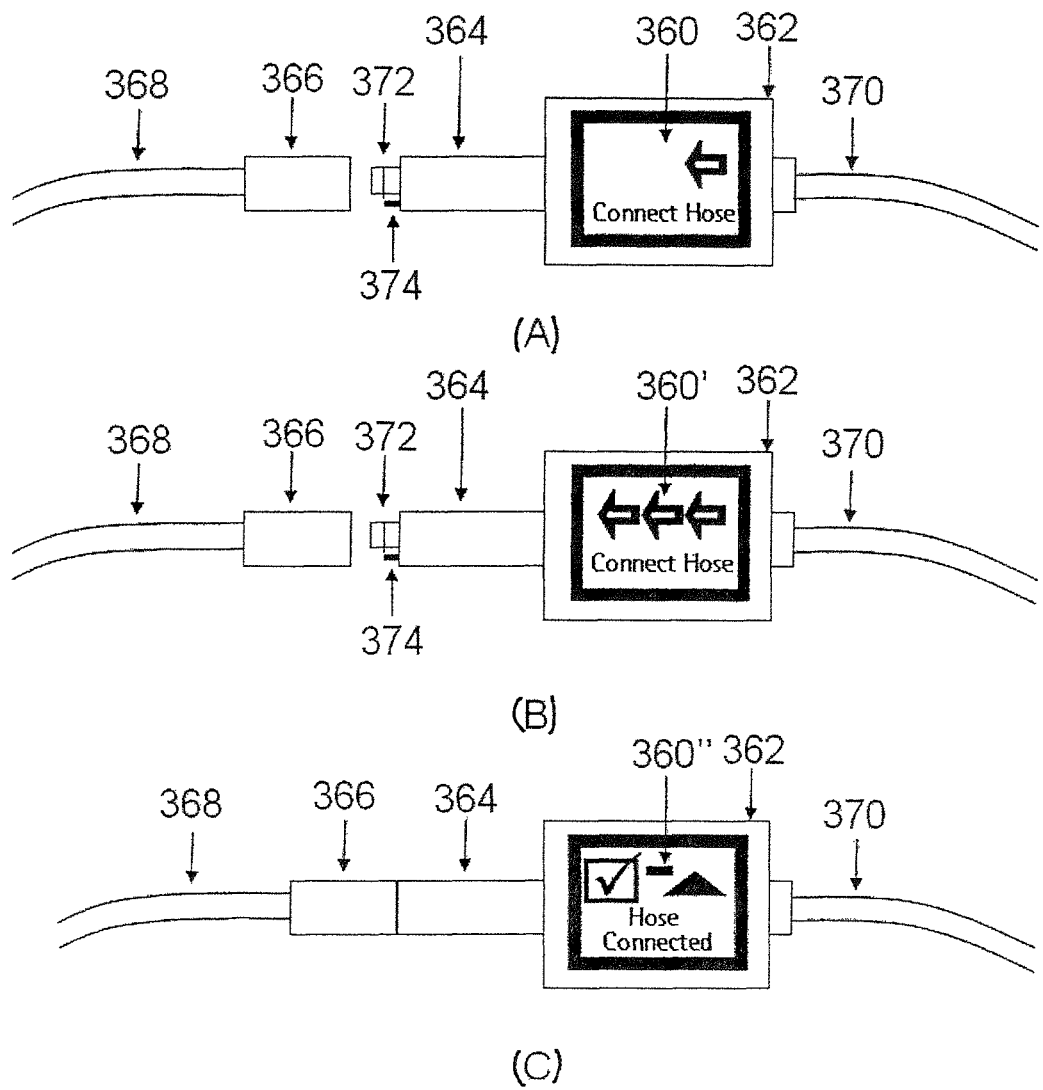
FIG. 6 shows an embodiment of a variable marker which can provide instructions to the operator for connecting at least two parts.

FIG. 6 shows an embodiment of a variable marker 360, 360', 360" which can provide instruction(s) to the operator for connecting at least two parts, exemplarily a first connector 366 and a second connector 364.

View (A) of FIG. 6 is a front view of a tubing 368 which uses the first connector 366 to connect to a hose 370 through the second connector 364, preferably with a male quick connect 372. The second connector 364 comprises an integrated associate connector 374 which sends a signal to the augmented reality display system when the hose 370 has been successfully connected. This signal can be a visual signal and/or an electromagnetic signal and/or an acoustic signal. An augmented reality display assembly 362 of the second connector 364 uses a dynamic screen to present an animated visual augmented reality display 360 that can instruct the operator through text, symbols, iconography, animation, video, audio, and/or other content the next step in the proper assembly of the connectors 366, 364.

View (B) of FIG. 6 is a front view of the hose assembly with the augmented reality display assembly 362 presenting another frame of the animated visual augmented reality display, i.e. another state of the variable marker 360', instructing the operator to connect the hose 370.

View (C) of FIG. 6 is a front view of the connected hose assembly where the hose connectors 364, 366 are properly connected. The integrated associate connector 374 may be depressed or in electrical contact with a complementary connector when the hose connectors 364, 366 are connected, causing a mechanical and/or electronic signal to the augmented reality display assembly 362 resulting in a change of the dynamic animated augmented reality display 362 to a new animated augmented reality display, i.e. a new state of the variable marker 360", which is presented to the augmented reality system and informs the system of a properly connected hose.

The dynamic animated augmented reality display 362 is an example of a variable marker, wherein the correct connection of the two connectors 364, 366 may result in the presentation of a new state of the marker which is displayed to the augmented reality system.

Figure 7:
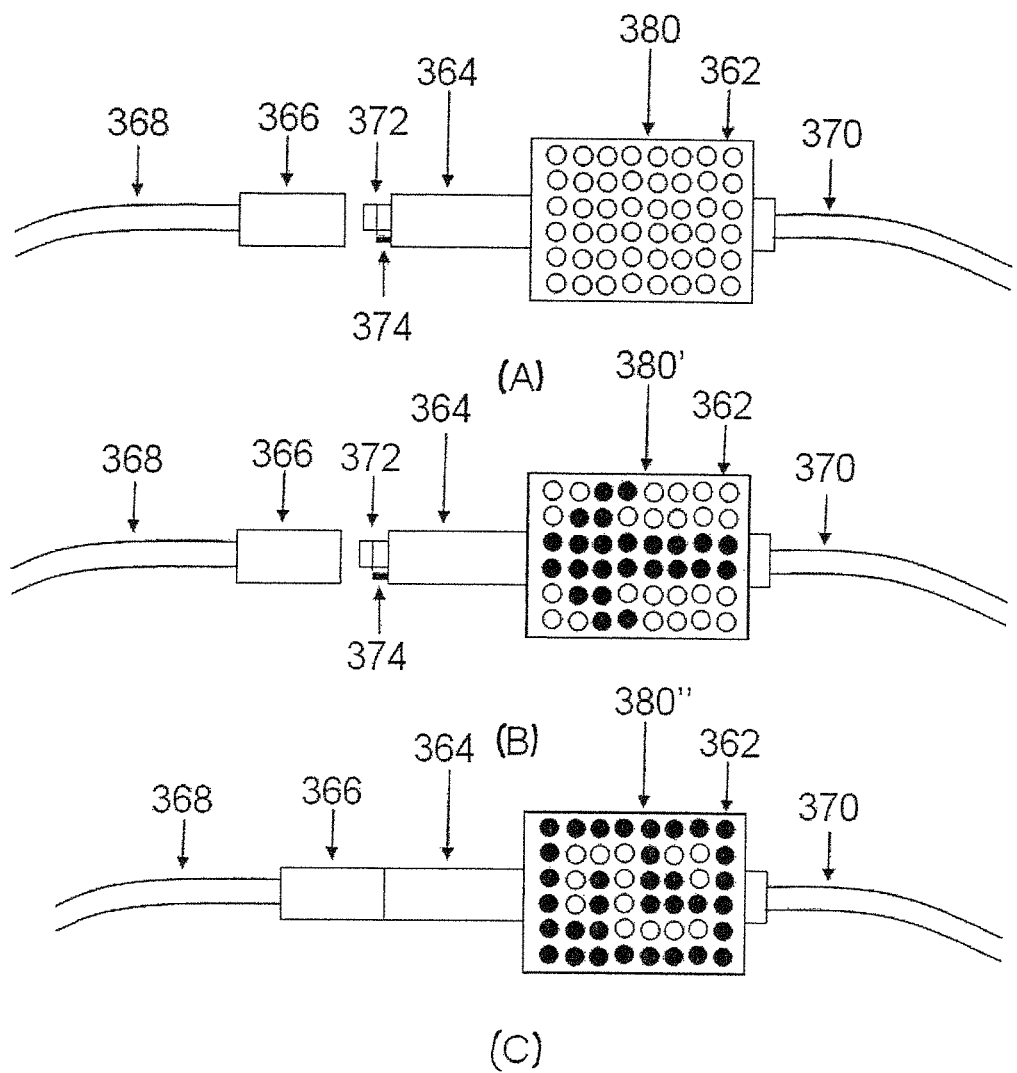
FIG. 7 shows an alternate embodiment of a variable marker using light emitting diodes (LED's) forming a display.

FIG. 7 shows an alternate embodiment of a variable marker 380, 380', 380" using light emitting diodes (LED's) forming a display 362 capable of instructing the operator to connect at least two parts, for example a tubing 368 and a hose 370.

View (A) of FIG. 7 is a front view of the tubing 368 which uses a first connector 366, exemplarily a female connector 366, to connect to the hose 370 through a second connector 364, exemplarily a male connector 364 which may comprise a male quick connect 372. The second connector 364 has an integrated associate connector 374 which sends a signal to the augmented reality display system when the hose 370 has been successfully connected to the tubing 368. The augmented reality display assembly 362 uses a dynamic LED screen to present a variable marker 380 that instructs the operator and/or provides information to the operator through text, symbols, iconography, animation, video, audio, and/or other content. The LED screen can be partially or completely composed of infrared LED's which can send information to the augmented reality system without observation by the operator by operating at a wavelength outside of the human visual range. The infrared LED's can provide information to the augmented reality system through text, symbols, iconography, or pulsating light patterns which can be viewed by a camera that can detect the presented infrared wavelength.

View (B) of FIG. 7 is a front view of the hose assembly with the augmented reality display assembly 362 presenting another frame of the animated visual augmented reality LED display, i.e. a new state of the variable marker 380', instructing the operator with an arrow to connect the hose 370.

View (C) of FIG. 7 is a front view of the connected hose assembly where the first and second connectors 364, 366 are properly connected and the integrated associate connector 374 is depressed. This action causes a mechanical and/or electronic contact or button to transfer a mechanical or electronic signal to the augmented reality display assembly 362 where it results in a change of the dynamic LED augmented reality display to a new LED augmented reality display, i.e. a new state of the variable marker 380" which is presented to the augmented reality system and informs the system of a proper connection of tubing 368 and hose 370.

Figure 8:
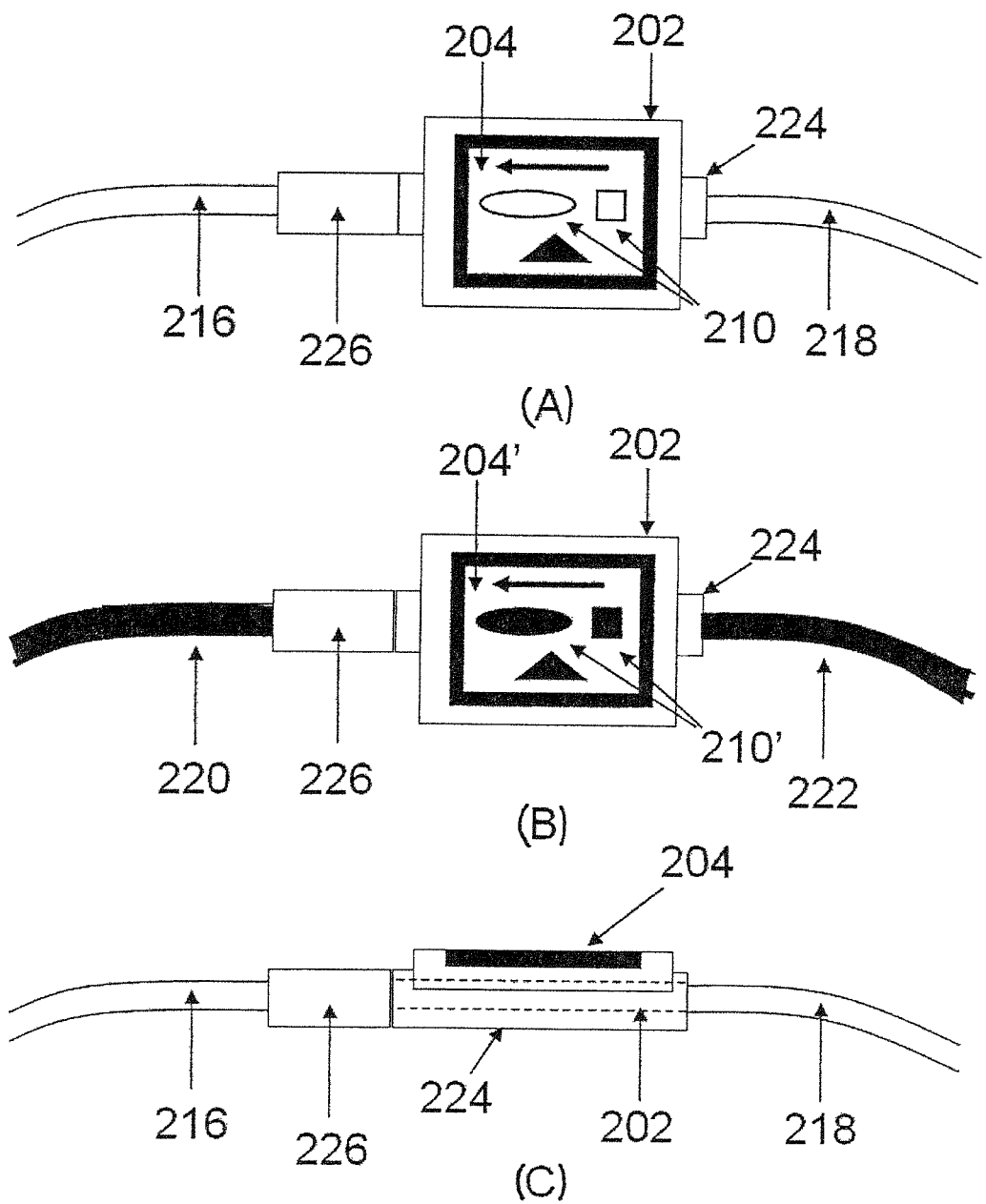
FIG. 8 shows another embodiment of a variable marker.

FIG. 8 shows another embodiment of a variable marker 204, 204', 204" that alters the appearance and display to an augmented reality system based on the presence, non-presence and/or movement of a material adjacent to the augmented reality marker.

View (A) of FIG. 8 is a front view of a hose assembly with a first hose 216 and a first hose connector 226 connected to a second hose 218 via a second hose connector 224 having an augmented reality display assembly 202 capable of displaying a visual variable marker 204. The variable marker 204 comprises two shape elements 210 that are cut into the marker that exposes the clear tubing 218 below or behind the variable marker 204. In other words the clear tubing 218, and thus the fluid inside the tubing 218, can be observed through the cuts of the shape elements 210 of the variable marker 204.

View (B) of FIG. 8 is a front view of the hose assembly when a colored fluid is present in the clear tubing 218, e.g. when the colored fluid in moving through the hose 220, 222. The colored fluid is shown through the openings of the variable marker 204' and results in the visual presentation of the two shape elements filled with color 210'. This results in a new state or appearance of the variable marker 204' to be presented to the augmented reality system and documents the completion of the work step that fluid is flowing through or present in the tubing 218.

View (C) of FIG. 8 is a side view of the hose assembly that shows the augmented reality display assembly 202 with a cutaway view of the clear tubing 218 running underneath the augmented reality marker 204, 204'.

Figure 9:
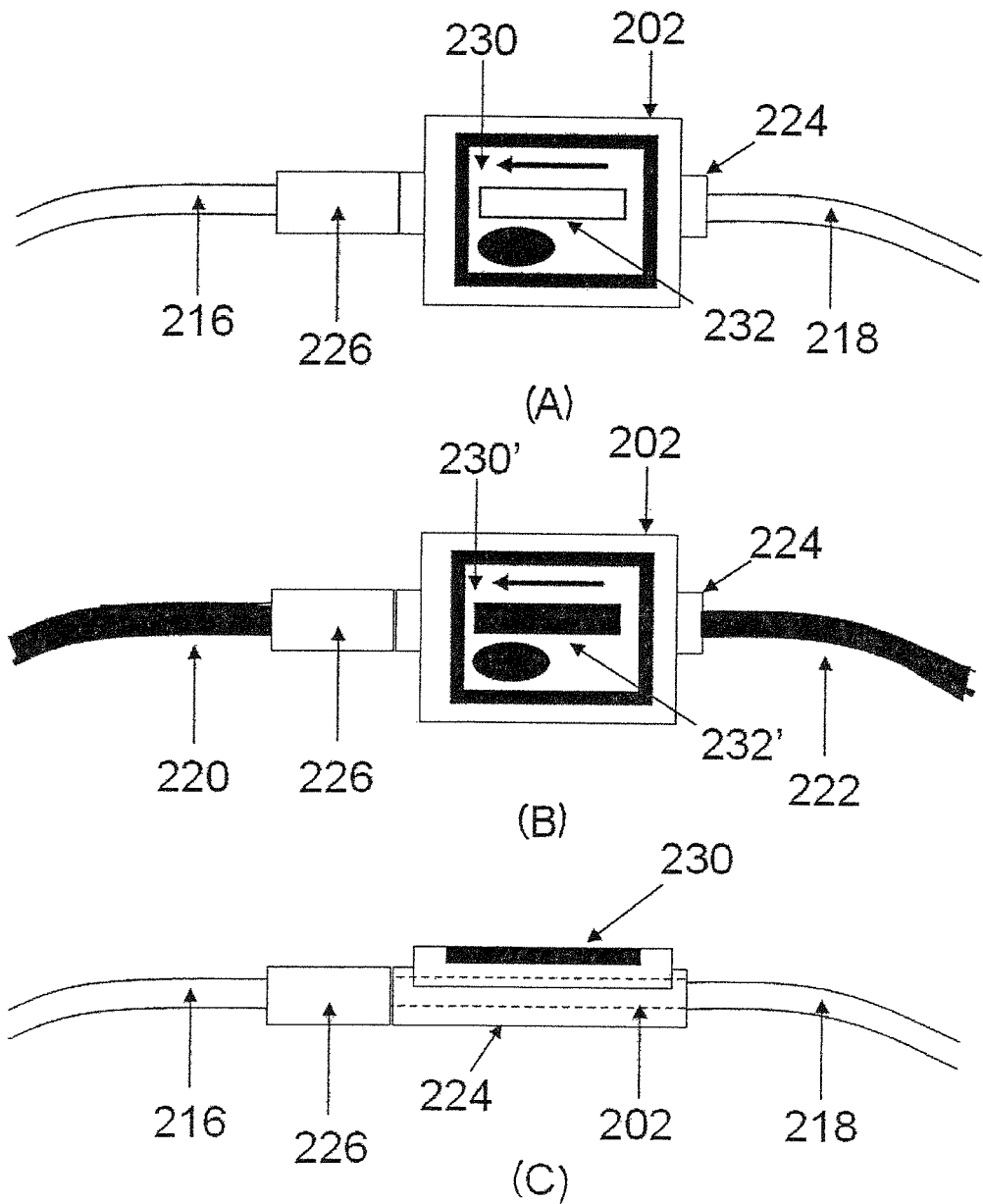
FIG. 9 shows another embodiment of a variable marker.

FIG. 9 shows another embodiment of a variable marker 230, 230' that alters the appearance and display to an augmented reality system based on the presence, non-presence and/or movement of a material adjacent to the augmented reality marker.

View (A) of FIG. 9 shows a front view of a hose assembly with a first hose 216 and a first hose connector 226 connected to a second hose 218 via a second hose connector 224 having an augmented reality display assembly 202 capable of displaying a visual variable marker 230. The augmented reality display assembly 202 may comprise a temperature sensitive device 232, for example a liquid crystal strip 232, that is embedded into the variable marker 230 that may sit atop of a tubing 218.

View (B) of FIG. 9 shows a front view of the hose assembly when a warm fluid is moving through the hose 220, 222. The warm fluid may have a temperature, which is greater than the room temperature, for example larger than 20 degrees Celsius. The heat from the fluid permeates through the tubing 218 and onto the temperature sensitive device 232', which may result in a change in color of the temperature sensitive device 232'. Consequently, the variable marker 230' alters its state resulting in a new appearance of the variable marker 230' that is presented to the augmented reality system and documents the completion of the work step that fluid is flowing through the tubing 218.

View (C) of FIG. 9 shows a side view of the hose assembly that shows the augmented reality display assembly 202 with a cutaway view of the tubing 218 running underneath the temperature sensitive device (not shown) of the variable marker 230. This embodiment of the dynamic augmented reality setup could also utilize shape memory polymers, cold hibernated elastic memory foams, chemical indicators, as well as pressure sensitive or other indicator tapes as a temperature sensitive device.

Figure 10:
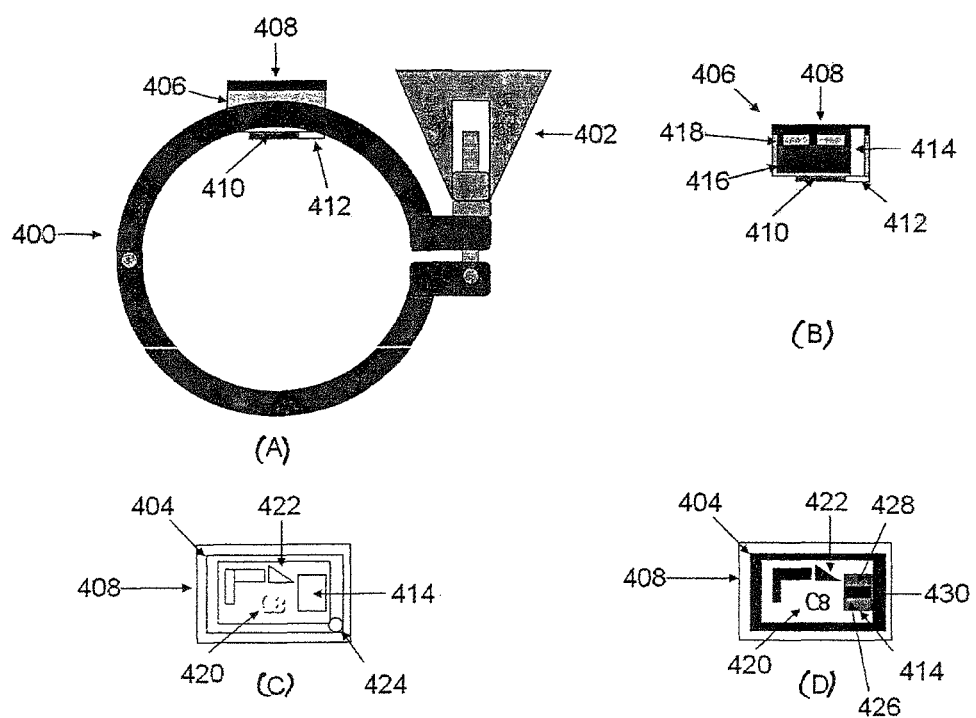
FIG. 10 shows an embodiment of a variable marker, which is pressure sensitive.

FIG. 10 shows an embodiment of a variable marker 408, which is pressure sensitive. The variable marker 408 can be mounted to a tri-clamp 400 as a preferred first set-up component. The variable marker 408 is liquid filled and presents an identifiable marker when the clamp 400 is closed. View (A) of FIG. 10 shows a side view of the tri-clamp 400, which is closed and tightened by a wing-nut latch 402 to fix a second set-up component such as a tubing. An augmented reality assembly 406 presents a variable marker 408 when a pressure plate 410 is depressed during the closure of the clamp around an assembly, like a sanitary assembly, comprising two connectors and a gasket. In other words the variable marker 408 is not presented or identifiable by a augmented reality system in case the clamp 400 is not closed properly. The embodiment depicted in FIG. 10 comprises a liquid dye filled augmented reality assembly 406 providing the variable marker 408. Alternatively, the augmented reality assembly 406 could also comprise a gel, sponge, or polymer base that is pressed against a transparent window to form a recognizable variable marker 408. Additionally an electronic and/or mechanical system can be utilized to present an variable marker 408 when the pressure plate 410 is depressed. A flexible transparent window 412 of the augmented reality assembly 406 can be utilized to confirm the presence of a gasket within the tri-clamp 400 and present it as part of the variable marker 408. Instead of the tri-clamp any other device can be used, which allows to apply pressure to the augmented reality assembly 406, like pressurized hoses, packers, pneumatic or hydraulic devices, pistons and so on.

View (B) of FIG. 10 shows a cutaway side view of the augmented reality assembly 406 that utilizes a flexible liquid reservoir 416 filled with a liquid dye which is compressed by the pressure plate 410 that squeezes the liquid dye through a tube assembly 418 into a closed augmented reality marker chamber 404 which presents the variable marker 408 when the clamp is closed around a tube or a hose or a sanitary assembly. The flexible transparent window 412 and viewing chamber 414 allow to visually control for the presence of the gasket.

View (C) of FIG. 10 shows a top view of an uncompressed augmented reality assembly 406 with a closed augmented reality marker chamber 404 which allows a dye to flow in through tubes connected to the flexible liquid reservoir when compressed and flow back into the reservoir through a drain 424 when the clamp is uncompressed. The variable marker 408 can contain a plurality of shapes and information which may include a clamp identifier 420 and/or an orientation identifier 422.

View (D) of FIG. 10 shows a top view of a compressed augmented reality assembly 406 with an augmented reality marker chamber 404 filled with dye from the flexible liquid reservoir including the clamp identifier 420 and an orientation identifier 422 which can now be read by the augmented reality system when the tri-clamp 400 is closed around a tube or a hose or a sanitary assembly. The transparent viewing chamber 414 can be used to confirm the presence of a gasket 430 as well as an upstream connector 428 and a downstream connector 426. For single use systems the augmented reality marker chamber 404 could comprise a membrane material that allows the dye to migrate to the surface and stain the membrane resulting in a permanent marker display after the clamp 400 has been closed. This membrane can be changed out after each use and be saved as a record of clamp closure.

Figure 11:
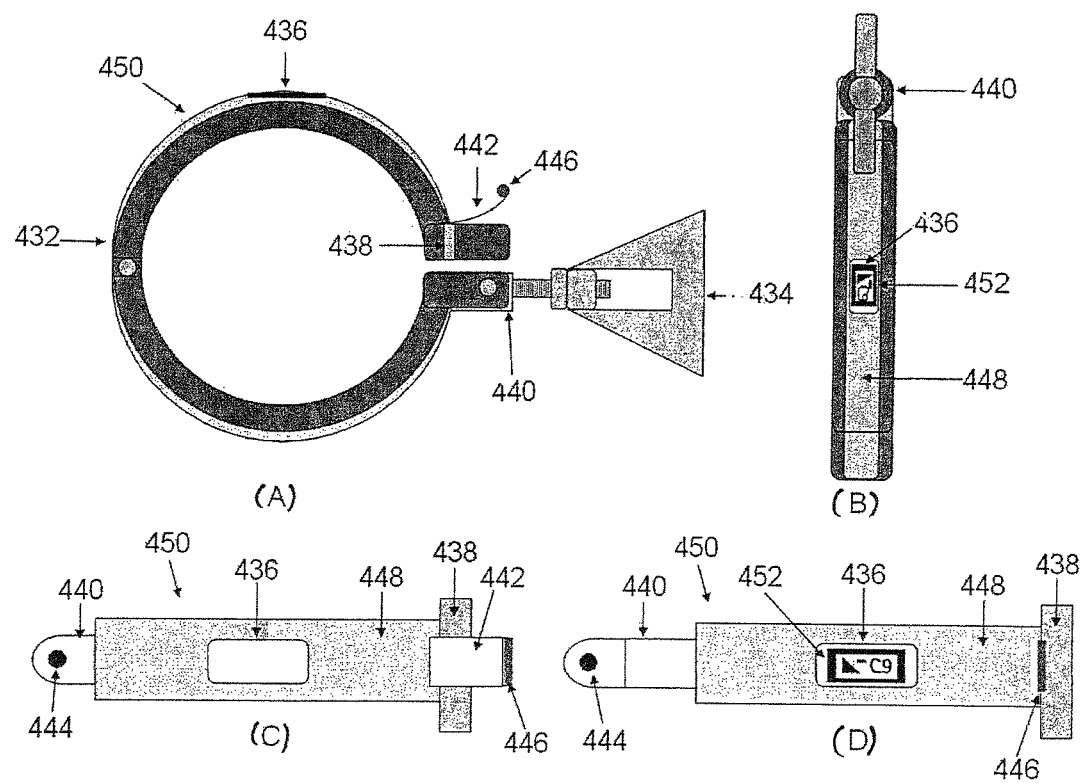
FIG. 11 shows another embodiment of a variable marker.

FIG. 11 shows an embodiment of a variable marker 452 indicating the closing state of a tri-clamp 432 as a preferred first set-up component. The embodiment of the tri-clamp shown in FIG. 11 comprises a removably attachable dynamic augmented reality marker sleeve assembly 450 which presents an variable marker through a transparent window 436 when the tri-clamp 432 is closed to fix a second set-up component such as a tubing.

View (A) of FIG. 11 shows a side view of the tri-clamp 432 covered externally by the removably attachable augmented reality marker sleeve assembly 450 which is attached to one side of the tri-clamp 432 by a clamp collar using an elastic or constricting clamp collar attachment device 438 and the bolt of the wing-nut latch 434 on the other side of the clamp. When the latch is closed to lock the tri-clamp 432 an internal ribbon 440 is pulled along with the latch 434 using the clamp latch attachment hole 444 (shown in view (C)) at one end of the ribbon 440 which causes the internal ribbon 440 to slide inside of the external sleeve 448 causing a pattern change of the variable marker 452 (shown in view (D)) that can be observed through a transparent display window 436. On the clamp collar side there can be excess of the internal ribbon 442 to allow for some slack in the ribbon to allow it slide through the external sleeve 448 as the latch bolt 434 is closed. A ribbon stopper 446 can prevent the ribbon 442 from moving all the way into the external sleeve 448 and can assist in resetting the augmented reality marker in the sleeve assembly 450 when the tri-clamp 432 is no longer in use.

View (B) of FIG. 11 is a top view of the closed tri-clamp 432 with the variable marker 452 visible through the transparent display window 436 located on the external sleeve (448).

View (C) of FIG. 11 is a top view of the removably attachable augmented reality marker sleeve assembly 450 in the opened clamp configuration with the variable marker not visible through the transparent display window 436 or not identifiable by the augmented reality system.

View (D) of FIG. 11 is a top view of the removably attachable augmented reality marker sleeve assembly 450 in the closed clamp configuration with the variable marker 452 visible through the transparent display window 436. A tri-clamp in the closed configuration with the augmented reality marker sleeve assembly 450 can present the variable marker 452 to the augmented reality system confirming that the tri-clamp 432 has been properly closed. The augmented reality marker sleeve assembly 450 can be removably attachable to the clamp so it can be re-used on different clamps of the same size. In alternate embodiments the augmented reality marker sleeve assembly 450 can be integrated directly into the tri-clamp 432 in an non removable manner. The internal ribbon 440 can comprise or consist of an elastic material which stretches as the clamp latch 434 is closed presenting the variable marker 452, or the augmented reality marker sleeve assembly 450 can present an electronic signal as a variable marker as in an active RFID/NFC tag signal when the clamp 432 is properly closed.

Figure 12:
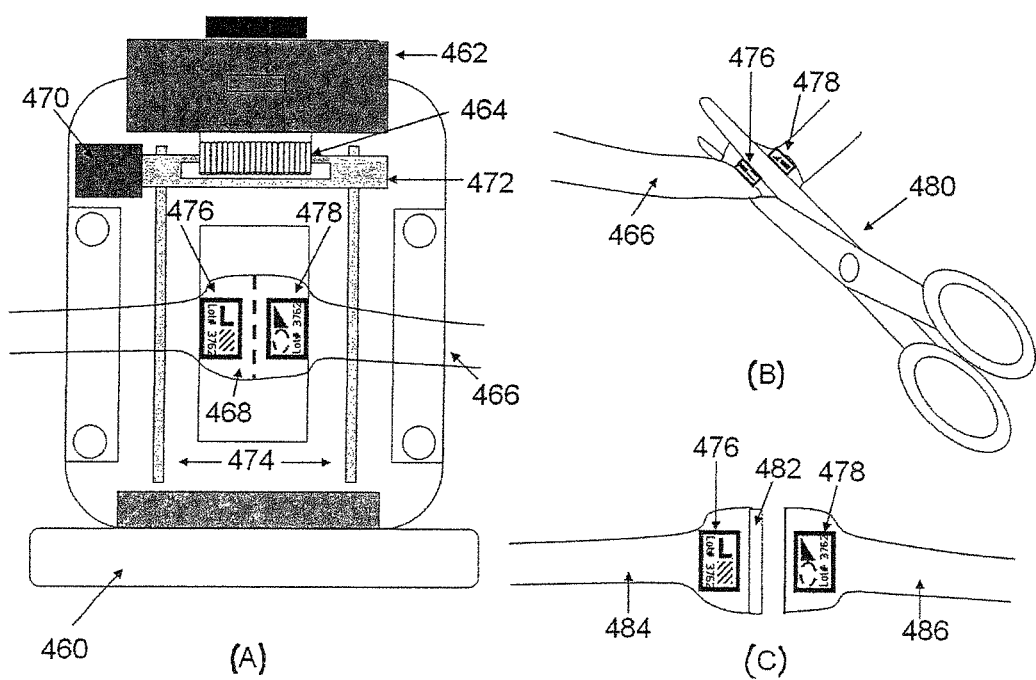
FIG. 12 shows a tube thermowelding unit.

FIG. 12 shows a tube thermowelding unit 460 with an integrated printer for printing lot specific markers onto a thermosealed tube 466 prior to cutting to serve as an indicator to an augmented reality system of a properly welded seal.

View (A) of FIG. 12 shows a top view of a tube thermowelding unit 460 which contains a thermowelding assembly 462 (shown in a raised configuration) and a heating element 464 which pushes down on and heats a thermoweldable tubing 466 until it forms a flat welded seal 468. The printer head 470 is positioned away from the heating element 464 during the welding operation. After the thermowelding assembly 462 is lifted and the weld has sufficiently cooled, the printer head 470 can move along a printer scaffold 472 that rides on top of two printer rails 474 to properly position the print head 470 over the flat welded seal 468. Two lot specific markers 476, 478 are printed including an upstream marker 478 and a downstream marker 476 as well as a cutting guideline.

View (B) of FIG. 12 shows a side view of the welded thermoplastic tubing 466 being cut by a sharp pair of scissors 480. This separates the sealed upstream and downstream tubing sections along with the upstream 478 and downstream 476 markers.

View (C) of FIG. 12 shows a top view of the separated tubing sections including the sealed upstream tube 486 and the sealed downstream tube 484. The thermowelded cut seal 482 is visible in between the upstream marker 478 and downstream marker 476. The markers 476, 478 can be recognized optically by an augmented reality system and documented as a properly welded seal provided that the markers 476, 478 are properly aligned in a predetermined way. Alternate embodiments of the printing system may be capable of printing markers onto the tubing of a thermowelder that performs sterile connections across at least two thermoweldable tubing pieces. Instead of integrating the printer into the thermoweldable device a portable handheld printer could also be used to print onto the flat welded seal of the thermowelded tube after the operation has been completed.

Figure 13:
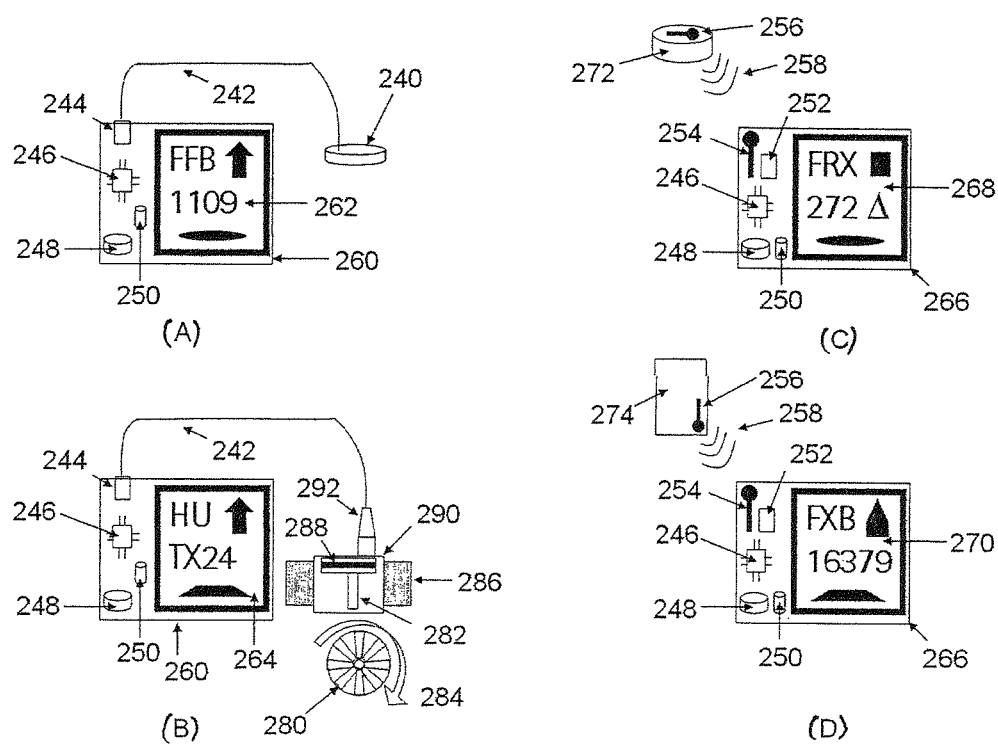
FIG. 13 shows further embodiments of a variable markers.

FIG. 13 shows several variable markers 262, 264, 268, 270 that alter their appearance and display to an augmented reality system based on a wired and/or wireless signal received from an electronic and/or mechanical device.

View (A) of FIG. 13 shows a front view of a wired dynamic augmented reality marker system 260 that contains a plurality of electronic sensing devices 240 that communicates through a wired connection 242 and is received by a communication device 244. The information is processed by a processor 246 and can be stored in or retrieve information from a memory storage device 250 and display a variable marker 262 to the augmented reality system depending on the outcome of the processed information. The wired dynamic augmented reality marker system 260 can be power by a battery 248, a power cord, or a wireless power system such as inductive charging.

View (B) of FIG. 13 shows a front view of a wired dynamic augmented reality marker system 260 that contains a plurality of electronic/mechanical sensing devices which may comprise a flow sensor 290 that utilizes an internal moving impeller 280, 282 that rotates 284 according to the flow of fluid through a tube 286 to produce an electronic signal through an electronic sensing device 288. This sensing device 288 can communicate through a wired connection 292, 242 or a wireless connection (not shown) and is received by a communication device 244. The information is processed by a processor 246 and can be stored in or retrieve information from a memory storage device 250 and display a variable marker 264 to the augmented reality system depending on the outcome of the processed information. The wired dynamic augmented reality marker system 260 can be power by a battery 248, a power cord, or a wireless power system such as inductive charging.

View (C) of FIG. 13 shows a front view of a wireless dynamic augmented reality marker system 266 that comprises one or more electronic sensing device(s) which include a wireless sensor 272 that utilizes an antenna 256 to communicate wirelessly 258 to a receiving antenna 254 and a communication device 252 within the wireless dynamic augmented reality marker system 266. The information is processed by a processor 246 and can be stored in or retrieve information from a memory storage device 250 and display a variable marker 268 to the augmented reality system. The wired dynamic augmented reality marker system 260 can be power by a battery 248, a power cord, or a wireless power system such as inductive charging.

View (D) of FIG. 13 shows a front view of a wireless dynamic augmented reality marker system 266 which comprises an internal equipment wireless broadcasting device 274 that utilizes an antenna 256 to communicate wirelessly 258 to a receiving antenna 254 and communication device 252 within the wireless dynamic augmented reality marker system 266. The information is processed by a processor 246 and can be stored in or retrieve information from a memory storage device 250 and present a variable marker 270 can be displayed to the augmented reality system. The internal equipment wireless broadcasting device 274 can be used to transmit information from process equipment software for work steps that may not be available visually on the exterior of the process equipment and transmit that information wirelessly to the dynamic augmented reality system. The wired dynamic augmented reality marker system 260 can be power by a battery 248, a power cord, or wireless power system such as inductive charging.

Figure 14:
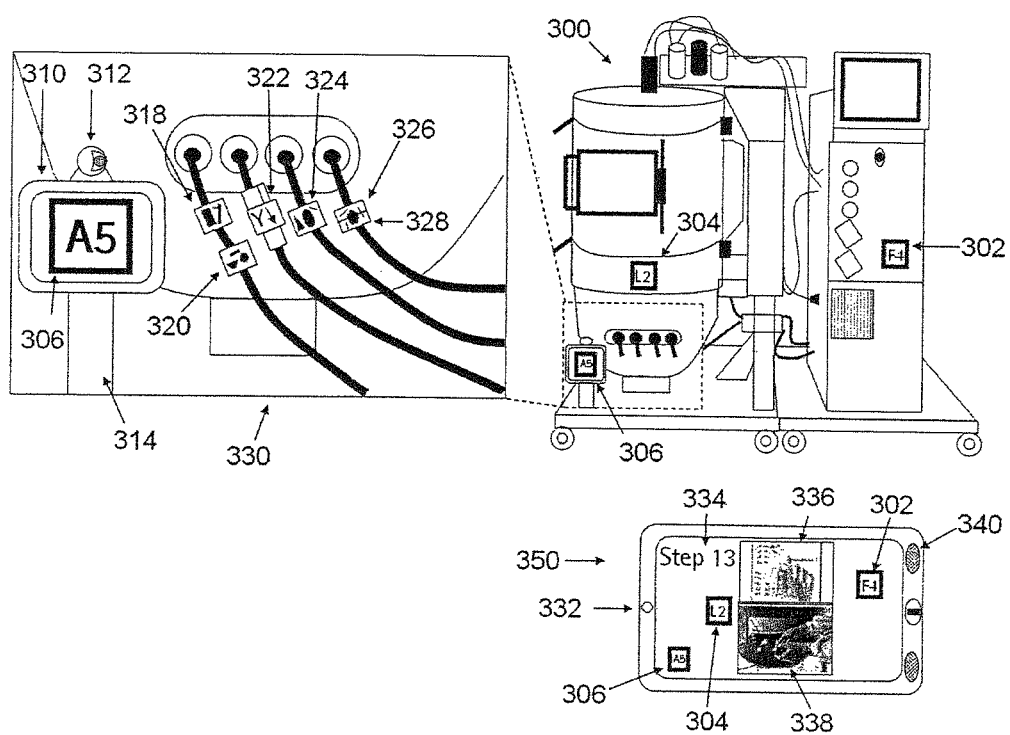
FIG. 14 shows a secondary augmented reality system.

FIG. 14 shows a secondary augmented reality system that is capable of reading markers and/or variable markers and presenting the information to a primary augmented reality system through the use of a variable marker. A single-use disposable bioreactor system 300 utilizing an augmented reality system with visual variable markers 302, 304, 306 provides an operator using a mobile tablet device 350, which serves as a primary augmented reality system and is equipped with a visual camera detection system 332, with the steps required for proper assembly of the bioreactor system 300 through augmented reality displayed content. This augmented reality displayed content on the mobile tablet device 350 includes a plurality of text 334, image/slides 336, video 338, audio commands 340 or other content.

A detailed view of one area of the bioreactor 330 shows a secondary augmented reality system 310, on a stand 314 that uses a camera device 312 to detect visual markers 306 from the connected hoses to the bioreactor unit. These hoses contain a plurality of non-variable, permanent or variable visual markers including two markers 318, 320 on a connected hose where the distance between the two markers 318, 320 is used for assembly confirmation; one variable marker 322 that changes the appearance when the hose is connected, one variable marker 324 that changes the appearance when fluid moves through the tubing; and one appearance marker 326, 328 that is formed from two halves 326, 328 of the marker which is detected by the augmented reality system when fully assembled.

The secondary augmented reality system 310 reads the configurations of the plurality of augmented reality markers, processes the information, and displays the information as a coded visual augmented reality marker 306 on a dynamic visual display system. This is recognized by the primary augmented reality system mobile tablet device 350 as a series of completed work steps and provides the operator with pre-programmed content to complete the next series of steps in a multi-step process. The other variable augmented reality markers 302, 304 can provide information from other regions of the bioreactor system 300 that is not visible from a front view (rear and sides of the unit) to an operator with a mobile tablet augmented reality system 350.

What is claimed is:

1. An assembling method for assembling a first set-up component to a second set-up component comprising the steps: capturing sensing data belonging to a working space by means of at least one sensing device of an augmented reality system, wherein the captured sensing data includes at least a part of the first set-up component and at least a part of the second set-up component and a marker associated with the first set-up component and/or the second set-up component and wherein the second set-up component is arrangable to the first set-up component in an positional and/or functional relationship; identifying the marker; deciding on a status of the positional and/or functional relationship of the first set-up component and the second set-up component with respect to each other; outputting an augmented representation of at least part of the captured sensing data and the decision of the status of the relationship.

2. The assembling method of claim 1, wherein the first set-up component comprises a first part of a marker and the second set-up component comprises a second part of the marker, and wherein the marker is identified when the first part of the marker and the second part of the marker are arranged in a positional and/or functional relationship with each other and wherein the processing device makes a decision on a status of the relationship of the first set-up component and the second set-up component.

3. The assembling method of claim 1, wherein the second set-up component comprises a variable marker, wherein the second set-up component is connectable to the first set-up component, wherein the variable marker is in a first marker state when the first set-up component and the second set-up component are disconnected and in a second marker state when the first set-up component and the second set-up component are connected and wherein the variable marker turns form the first marker state to the second marker state, when the first set-up component is connected to the second set-up component.

4. The assembling method of claim 1, wherein the first set-up component comprises a first marker and the second set-up component comprises a second marker, wherein at least a part of the first set-up component with the first marker and at least a part of the second set-up component with the second marker are captured by means of the at least one sensing device, wherein the first and second markers are identified by the processing device, and wherein it is decided whether the first set-up component and the second set-up component are connected to each other based on the captured position of the first marker and the second marker.

5. The assembling method of claim 4, wherein the processing device retrieves respective digital information assigned to the identified marker from a database.

6. The assembling method of claim 4, wherein at least one of the first set-up component and the second set-up component is one of an integrity testing device, a container controlling unit, an integrity testable product, a container, a disposable container, a disposable bag, a bioreactor, a disposable bioreactor, a spinner flask, a filter device, a pump, a valve, a hose, and a supply terminal.

7. The assembling method of claim 4 comprising the step: generating an enabling instruction in case the first set-up component is compatible to the second set-up component.

8. The assembling method of claim 4, comprising the steps: determining the spatial distance between the first marker and the second marker based on the sensing data captured by the at least one sensing device, wherein the processing device makes a decision on a correct connection of the first set-up component with the second set-up component based on the determined spatial distance; output an augmented representation comprising a representation of the decision on the correct connection.

9. The assembling method of claim 1, wherein said marker and/or variable marker is any one of a visual marker, an electromagnetic marker, a geospatial location marker, and an audio marker.

10. The assembling method of claim 1, wherein the alignment and/or the connection of the first set-up component and the second set-up component includes any one of connecting a hose, closing a clamp, connecting a wire, assembly of an item, inserting a bag into a container, and running a fluid through a pump, hose, or filter.

11. The assembling method of claim 10, wherein the completion of said process event is manually registered by an operator.

12. A monitoring method for monitoring a physical property comprising the steps:
providing an augmented reality system with a processing device, an output device and at least one sensing device, whereby the at least one sensing device is capable of capturing sensing data belonging to a working space;
providing a set-up component comprising a variable marker at the working space, wherein the variable marker is in a first marker state when the physical property of the set-up component is in a first property state and wherein the variable marker is in a second marker state when the physical property is in a second property state and wherein the variable marker turns from the first marker state to the second marker state, when the physical property changes from the first property state to the second property state;
capturing at least the variable marker with the sensing device, wherein the variable marker is identified by the processing device; and
outputting an augmented representation of at least part of the captured sensing data and the decision whether the variable marker is in first marker state or in the second marker state.

13. The monitoring method of claim 12 comprising the steps: identifying the variable marker, whereby the processing device retrieves digital information assigned to the identified variable marker from a database; and outputting an augmented representation comprising at least part of the retrieved digital information.

14. The monitoring method of claim 12, wherein said marker and/or variable marker is any one of a visual marker, an electromagnetic marker, a geospatial location marker, and an audio marker.

15. A computer-readable storage medium for a computer-aided assembly of a measurement or production set-up and/or for automatically monitoring a measurement or production set-up, wherein the computer-readable storage medium comprises coding segments that when loaded and executed on a' suitable system can execute the method of claim 1.

16. An augmented reality system for monitoring a measurement or production set-up, the augmented reality system comprising: at least one sensing device capable of capturing sensing data belonging to a working space; a processing device, which is in communicatively connected to the at least one sensing device, and which is capable of capturing sensing data belonging to a working space by means of at least one sensing device of an augmented reality system further comprising a processing device and an output device, wherein the captured sensing data includes at least a part of the first set-up component and at least a part of the second set-up component and a marker associated with the first set-up component and/or the second set-up component and wherein the second set-up component is connectable to the first set-up component; identifying the marker by means of the processing device; deciding on a status of the alignment or connection of the first set-up component and the second set-up component; an output device configured for outputting an augmented representation of at least part of the captured sensing data as well as the decision on the status of alignment or connection.

17. The augmented reality system of claim 16, wherein at least one sensing device is a camera.

18. The augmented reality system of claim 16, wherein the output device is a projector projecting the augmented representation onto the working space or onto a set-up component, whereby the augmented representation is adjusted and displayed in accordance with the spatial distribution of the component.

19. A monitoring method for monitoring at least one set-up component of a measurement or production set-up comprising the steps: providing a secondary augmented reality system with a secondary processing device, a secondary output device and at least one secondary sensing device, whereby the at least one secondary sensing device is capable of capturing sensing data belonging to a working space; providing a primary augmented reality system with a primary processing device, a primary output device and at least one primary sensing device, whereby the at least one primary sensing device is capable of capturing sensing data belonging to the secondary output device; providing at least one set-up component at the working space; capturing the at least one set-up component or a marker associated to the at least one set-up component by means of the secondary sensing device; processing sensing data captured by the secondary sensing device by means of the secondary processing device; displaying a variable marker at the secondary display working space depending on the sensing data processed by the secondary processing device; capturing the variable marker by means of the primary sensing device, wherein the variable marker is identified by the primary processing device; outputting an augmented representation of at least part of the captured variable marker.

20. An augmented reality system for monitoring a measurement or production set-up, the augmented reality system comprising: a secondary augmented reality system with a secondary processing device, a secondary output device and at least one secondary sensing device, whereby the at least one secondary sensing device is capable of capturing sensing data belonging to a working space; a primary augmented reality system with a primary processing device, a primary output device and at least one primary sensing device, whereby the at least one primary sensing device is capable of capturing sensing data belonging to the secondary output device, wherein the at least one the secondary sensing device is capable to capture a set-up component or a marker associated to the at least one set-up component located in the working space; wherein the secondary processing device is capable of processing sensing data captured by the secondary sensing device and configured to generate a marker or variable marker based on the processing; wherein the secondary output device is configured to display the generated marker or variable marker and wherein the primary output device is configured to display an augmented representation of at least part of the captured marker or variable marker.

21. The augmented reality system of claim 20, wherein the primary augmented reality system is a mobile device.

* * * * *